United States Patent [19]
Luzzatto

[11] Patent Number: 6,031,521
[45] Date of Patent: Feb. 29, 2000

[54] COMPUTER OPERATING POINTER DEVICES AND COMPUTER OPERATING PROCESSES

[76] Inventor: Marco Luzzatto, 33 Betzalel Street, Tel-Aviv, Israel, 64683

[21] Appl. No.: 09/011,483

[22] PCT Filed: Aug. 12, 1996

[86] PCT No.: PCT/IL96/00078

§ 371 Date: Feb. 11, 1998

§ 102(e) Date: Feb. 11, 1998

[87] PCT Pub. No.: WO97/08603

PCT Pub. Date: Mar. 6, 1997

[30] Foreign Application Priority Data

Aug. 14, 1995 [IL] Israel .......................................... 114931
Feb. 12, 1996 [IL] Israel .......................................... 117106

[51] Int. Cl.[7] .................................................. G09G 5/08
[52] U.S. Cl. ........................... 345/157; 345/160; 345/162; 345/163
[58] Field of Search .................. 345/156, 157, 345/160, 162, 163

[56] References Cited

U.S. PATENT DOCUMENTS

| | | |
|---|---|---|
| 4,859,995 | 8/1989 | Hansen et al. . |
| 5,153,571 | 10/1992 | Takahashi . |
| 5,367,631 | 11/1994 | Levy . |
| 5,392,400 | 2/1995 | Berkowitz et al. ...................... 709/203 |
| 5,408,602 | 4/1995 | Giokas et al. ........................... 345/329 |
| 5,487,084 | 1/1996 | Lindholm ................................ 375/215 |
| 5,530,455 | 6/1996 | Gillick et al. ............................ 345/163 |
| 5,694,150 | 12/1997 | Sigona et al. ............................ 345/145 |
| 5,706,505 | 1/1998 | Fraley et al. ............................. 707/103 |
| 5,760,764 | 6/1998 | Martinelli ................................ 345/160 |
| 5,945,979 | 8/1999 | Rutledge et al. ........................ 345/161 |

OTHER PUBLICATIONS

"Microsoft Visual C++5" by Steven Holzner, Sybex (1997), pp. 338–347.

*Primary Examiner*—Richard A. Hjerpe
*Assistant Examiner*—Henry N. Tran
*Attorney, Agent, or Firm*—Eugene Lieberstein; Michael N. Meller

[57] ABSTRACT

A method for operating a computer by means of a pointer comprises providing counters for memorizing coordinate displacements of the pointer index; choosing one of two modes, the REGISTER OR MEMORY (R/M) mode or the ACTIVE OR PLAY (A/P) mode; when in the R/M mode, moving the pointer index from a selected base point to a reference position corresponding to a computer operation, and memorizing the resulting pointer index displacements; and when the pointer in the A/P mode, bringing the pointer index to the base point, applying to it the memorized displacements, thus moving it from the base point to the reference position, and carrying out the operation corresponding to this latter. A computer apparatus comprises, in addition to the conventional elements of a pointer operated computer, counters for registering differential displacements and means for retrieving from the counters the registered differential displacements and applying them to a base position of the pointer. The nonconventional elements of the apparatus are preferably included in the pointer or part of an Asynchronous Interface.

32 Claims, 13 Drawing Sheets

COMPUTER OPERATING POINTER DEVICES AND COMPUTER OPERATING PROCESSES

FIELD OF THE INVENTION

This invention relates to improvements in pointer devices for operating computers, in computer operation processes and in apparatus comprising computers and pointer devices. It also relates to apparatus comprising computers and, in general, serial devices, and to interfaces between computers and serial devices.

BACKGROUND OF THE INVENTION

A large percentage of personal computers presently produced are operated by means of pointer devices. A pointer device consists of a hardware element and a software element. The hardware element is a device which generally is movable or includes a movable component, or which comprises other means for generating a motion, and the software element comprises an index or cursor generated and controlled by a program, which index moves over the computer display or screen in response to the displacements of the movable hardware element device or of a movable component thereof or to other motion generating commands of the hardware element—hereinafter "mechanical control displacements" or, briefly, "the control displacements". Said response, however, exists only as far as the index displacements are contained within a certain field, which can be called "the pointer active field", the dimensions of which are generally determined by those of the computer display or screen or of the part thereof within which the index is visible. Thus, when the control displacements in a certain direction have brought the index to the border line of the computer display, any further displacement of the movable device or component of the hardware element in the same direction causes no further response of the index. Hereinafter, when mention is made of index (or cursor) displacements or of control displacements, it should be understood that they are displacements within the pointer active field, unless otherwise specified. Further, it should be kept in mind that only the index displacements are directly relevant to the computer functions, and, for instance, determine what operation should be carried out or where it should be carried out. Therefore, whenever mention is made of pointer displacements, it should be understood that displacements of the pointer index (or cursor) are meant, unless otherwise specified.

Many kinds of pointer devices are known in the art and the present invention applies to all, although it will be particularly described with reference to a most common pointer device, viz. to a mouse. A mouse is a device which can be displaced by sliding it over a plane surface. Each displacement causes a rolling of a sphere, mounted in the mouse, over said plane surface, and therefore a rotation of the sphere with respect to the body of the mouse, which rotation, through a mechanism provided in the mouse, measures the mouse displacements along two different coordinates, viz. X- and Y-displacements. Digital signals representing displacements are sent to the computer by means of a conductor connected to an input port of this latter. An index (or cursor), which represents the mouse, is visualized by the computer software on the computer display. It appears, when the computer is switched on, in an initial or origin position, which may be called "the mouse origin point", and subsequently moves from it, synchronously with the motions of the mouse. The positions of the mouse index are defined by Cartesian coordinates—hereinafter "X and Y mouse index coordinates", or, briefly, "X and Y mouse coordinates", and its displacements by changes in the value of those coordinates. The minimum such changes to which the computer is sensitive and which will cause an actual motion of the mouse index, as small as it may be, will be called "elementary X and Y coordinate displacements". A pair (X,Y) of elementary coordinate displacements, occurring concurrently, define an elementary vector displacement. The computer applies each elementary X and Y displacement to initial or origin coordinates $X_0$ and $Y_0$ of the mouse index to calculate the present or actual mouse index coordinates. When a command is given—normally be means of what can be called a "mouse event", e.g. the actuation of a mouse key—to perform an operation connected to the mouse, the operation which corresponds to the actual mouse index coordinates is performed by the computer. Hereinafter it will be assumed that $X_0=Y_0=0$. If different values were attributed to the initial coordinates, they could be easily taken into account.

Some computers are controlled by means of a mouse that is stationary, and may be or not be mounted on and integral with the computer, and is provided with a sphere—which in such cases is called "trackball"—directly actuated by the operator's hand. Rotation of the sphere causes displacement of the mouse index, in the same manner set forth hereinbefore. While in the case of the movable mouse the control displacements, measured by the rotation of the sphere with respect to the body of the mouse, are caused by the sliding of the mouse itself over a plane surface, in the case of a stationary mouse the rotation of the trackball is caused directly by the operator's hand. For the purpose of this description, it is convenient to consider what may be called "virtual" mouse displacements, viz. the displacements of a movable mouse that would cause its sphere to rotate by the same angles by which the trackball actually rotates, and consider them as the control displacements.

Other pointer devices have hardware elements that do not comprise spheres, but are based on the linear motion of a movable component over a surface that is sensitive to such a motion. The linear displacements of said movable component are the control displacements, and they cause corresponding displacements of a pointer index, which constitutes a software element analogous to that of a mouse device. Said motion sensitive surface may be separate from the computer or may even be the computer display itself. Examples of such pointers are Light Pens, Touch Screens, Touch Pads, Sense Pens, Digitizers. Each of them comprises a movable component that is displaced over a stationary surface, which in the case of the first two is a special computer display, while in the case of the others is a separate, dedicated surface. In some cases, the operator's finger might act as the movable component. All of them, as well as the mouse devices, generate, with the displacements of the movable component, digital information that is transmitted to the computer: therefore this invention is equally applicable to all.

In the following description, reference will be made to movable mouse devices, but only for purposes of example, as what is essential to the invention is the existence of pointer index displacements corresponding to pointer control displacements, and the mechanical nature of said control displacements and their mechanical causes are irrelevant. Further, the correspondence of said index displacements and said control displacements is essentially the same in all pointer devices, so that the description of the invention with reference to movable mouse devices can be applied immediately, by any skilled person, to other types of pointers. The term "mouse", therefore, as used in this description and claims, should always be understood as comprising any type of pointers, unless specific reference is made to a structure exclusive to mouse devices, and even then, such reference is to be considered as made only for illustrative and not for limitative purposes.

In normal mouse or generally pointer operation, as is well known to skilled persons, the pointer is connected to the computer through an electronic circuit interface, that can be a special one, viz. delivered together with the pointer, or may be a standard interface used in the computer for general purposes, for instance, a serial interface. In the case of a PC, such electronic circuit may be an Asynchronous Interface (AI/F), e.g. that known as RS-232 Standard. When any action is carried out by means of the pointer, viz. a pointer (mouse) event occurs, e.g., a mouse key is actuated or a mouse is displaced, the interface communicates this fact to the computer CPU by means of a signal, which is known as the Interrupt Request Signal (hereinafter IRQ) and is accompanied by data transmitted by the mouse itself to the interface controller input register. The CPU, when it receives the IRQ, interrupts the process that it was carrying out and starts a software routine, which is called the Interrupt Service Routine (hereinafter ISR) and which is soft-wired to the Interrupt Vector (IV), a region in the Random Access Memory (RAM) which contains the addresses of the service routines that are resident in memory. The main role of the ISR is to read the data from the interface to the pointer, to interpret it and to store it in a public domain of the RAM for future use. A different ISR, and associated routines, is required for each type of pointer and is installed in the computer memory by loading a software driver, generally provided by the mouse manufacturer and embodied in a diskette. Some programs or operating systems, such as Windows, include drivers for a number of mouse devices, and if a mouse is to be used that is not one of them, the corresponding driver must be installed during set-up.

For the purpose of permitting communication with the pointer, a Service Library (hereinafter SL) is also loaded by the mouse driver and is soft-wired to a public software interrupt number of the IV. The SL comprises a number of utility functions. One of them is the connection of the User Mask Routine (UMR) address to the ISR. When a pointer event, such as a unit displacement of its mobile part or the actuation of a pointer button occurs, the ISR reads the data from the interface and asks whether a UMR is present. If the answer is positive and the event can be "masked on", viz. accepted, the control of the computer is passed to the user program, by means of the UMR, which now communicates freely with the pointer through the functions of the SL. When the event has been completed, the control is returned to the process which was interrupted by the IRQ. The above well known features of pointer operation should be kept in mind for a complete understanding of the embodiments of the invention to be described. Said features apply to stationary mouse devices as well, and essentially to all pointer devices, with variations that are well known and understood by skilled persons.

The operation of a computer by means of a pointer, and particularly of a mouse, often requires several displacements of the pointer index or cursor, in order to position it at certain zones of a Tool Bar and/or of an opened window and there to actuate it to cause it to transmit to the computer the desired commands. When an operation is to be carried out several times in a computer session, the repetition of the same pointer displacements and commands is troublesome and time consuming. Macro recorder routines, that are available in various forms in computer software, are not fully satisfactory, because on the one hand they are complex and involve a dialogue between computer and operator, and, on the other hand, they require the operator to learn many different actions that are not so frequently used as to be easily remembered Furthermore, they are not always time saving and are limited as to the operations that they permit to perform. Finally, they are software-dependent and therefore not universally applicable.

It is an object of this invention to facilitate the operation of computers by permitting to carry out selected operations in a quicker and easier manner.

It is another object of this invention so to facilitate the operation of a pointer controlled computer, while using a pointer that is completely or nearly conventional in structure.

It is a further object of the invention to permit to select operations in a pointer controlled computer without having repeatedly to displace the pointer or a movable part thereof in order to select the operation It is a still further object of the invention to permit to achieve the aforesaid objects, while selecting the desired operations and changing said selection whenever desired.

It is a still further object of this invention to provide a method for operating a pointer controlled computer which renders the operation of the computer quicker, easier and more versatile, by particularly simple and economical means.

It is a still further object of this invention to provide a method for operating a computer controlled by a pointer that is completely or nearly conventional in structure, which method permits to carry out selected operations in a quicker and easier manner.

It is a still further object of this invention to provide a method for operating a computer and/or an improved pointer structure and/or improved interfaces between pointer and computer, which permit repeatedly to carry out by one or two commands a sequence of a plurality of operations.

It is a still further object of this invention to provide a method for operating a computer and/or an improved pointer structure and/or improved interfaces between pointer and computer, which permit to repeat any number of times a selected operation or sequence of operations.

It is a still further object of this invention to achieve the aforesaid objects with respect to a pointer that is a mouse device.

It is a still further object of this invention to provide a method for operating a combination of a serial device and a computer.

It is a still further object of this invention to provide an improved interface between a serial device and a computer.

It is a still further object of this invention to provide an improved combination of a serial device, a computer and an interface between them.

It is a still further object of this invention to facilitate and accelerate carrying out complex computer operations, e.g. as in graphic work in CAD/CAM methods, and the like.

It is a still further object of this invention to provide an improved computer method and apparatus which permits to register and exactly to reproduce pointer index paths.

It is a still further object of this invention to provide an improved computer method and apparatus which permits to register and exactly to reproduce geometric shapes and configurations of any complexity.

It is a still further object of this invention to provide an improved computer method and apparatus which is independent of the particular computer to which it is applied and to the software by which it is operated.

It is a still further object of this invention to achieve the aforementioned objects without interfering with the computer software.

Other objects and advantages of the invention will become apparent as the description proceeds.

SUMMARY OF THE INVENTION

The following nomenclature will be used in this specification and claims.

"Actual position" of the pointer (particularly mouse) index—sometimes briefly "actual position of the pointer"—means the position in which the pointer index is located at any time, and particularly when a selected operation is to be carried out.

"Counter coordinates" means the coordinates associated with a specific position of the pointer index.

"Coordinate pointer (mouse) index displacements", or briefly, "pointer (mouse) displacements" means the changes in the X and Y coordinates, associated with the position of the pointer (mouse) index, when it moves from one point to another. They are parallel to the two coordinate axes and have the sign + or −, according to their direction. They are therefore vectors parallel to the X and Y axes.

The size of the "(pointer index) elementary coordinate displacements", which are, as has been said, the smallest displacements that a pointer index can make along the X and Y axes, and of the corresponding elementary vector displacements, depends on the particular pointer and especially on the particular system in which the pointer operates. In general, all coordinate displacements that are not elementary ones are algebraic sums of elementary coordinate displacements, and all vector displacements that are not elementary ones are vectorial sums of elementary vector displacements. When reference is made hereinafter to pointer index displacements it should be understood that, in general, the pointer index undergoes such displacements by successively undergoing a number of elementary displacements, so that the expression "pointer (index) displacement" signifies a succession of elementary displacements. In all cases, it will be obvious whether reference to coordinate or to vector displacements is intended.

"Reference position" means a position of the pointer (particularly mouse) index in which the pointer can cause the computer to perform a chosen activity, including a position in which the pointer (particularly mouse) causes a menu to be displayed on the computer screen.

In the following description, reference will usually be made to events, actions and operations that are associated with a Windows program. It must be emphasized that this is done for purposes of illustration only and involves no limitation, as the invention is applicable to computers operated by means of any program; in other words, the invention is program-independent (as well as computer- and system-independent).

Keeping this is mind, it should be understood that a reference position need not be a sharply defied one. In many cases, it is any position comprised in a small area on the computer screen, to which correspond two narrow ranges of mouse coordinates, as when the pointer index is placed in a zone of the TOOL BAR which corresponds to a given window, such as the FILE or EDIT or other window, or to a given operation on the window menu, such as OPEN, CLOSE, FIND, and the like.

"Reference differential displacements" or, briefly, "differential displacements", means the displacements required to bring the pointer (particularly mouse) index from a reference position to another position, which will be called "a base position" or "base point". The base position may be the actual pointer (particularly mouse) index position or a fixed position or a position which the pointer index has previously occupied and the coordinates of which have been memorized, as will be better explained hereinafter. Therefore each differential displacement is relative to two points: the reference position and the base point.

"Reference counter coordinates" means the counter coordinates associated with a reference position of the pointer (particularly mouse) index.

Obviously, the pointer index would move back from a base point to a reference position by displacements that are the opposite of the corresponding differential displacements. It will be apparent that the pointer index could be brought from the pointer origin position to a reference position by bringing it firstly to a base point and then from it to the reference position, viz. by applying to it firstly the counter coordinates of the base point, viz. the displacements from the origin to said base point, and then the opposite of the differential displacements corresponding to said reference position and said base point. If the counter coordinates of the base point are indicated by DX and DY, those of the reference position are indicated by $\Delta X$ and $\Delta Y$, and the differential coordinate displacements are indicated by $\delta X$ and $\delta Y$, it is obvious that $\Delta X = DX - \delta X$ and $\Delta Y = DY - \delta Y$: viz. the reference counter coordinates are equal to the base point counter coordinates minus the differential coordinate displacements. Thus, e.g., if DX and $\delta X$ have opposite directions, $\Delta X$ has the direction of DX and length equal to the sum of the lengths of DX and $\delta X$; if they have the same direction, $\Delta X$ has the direction of the larger of the two and its length is the difference of their lengths.

It is stressed that the expression "pointer (mouse) displacements"—sometimes briefly "pointer (mouse) displacements"—refers to changes in the coordinates of the pointer (mouse) index or cursor (which are visualized by its displacements on the computer display), and it is irrelevant by what control displacements they are caused, viz. it is irrelevant whether such changes are caused by moving a conventional mouse over a surface, whereby correspondingly to rotate its sphere, by directly rotating the trackball of a stationary mouse, or by linearly displacing another kind of pointer. Displacements of a pointer index can also be produced without corresponding mechanical displacement of the pointer or of any part thereof, e.g. by moving a finger over a display or by electrical means actuated, for example, by keys or by a joystick or the like. All displacements of a pointer index, no matter how produced, are comprised in the displacements to which this invention refers.

The absolute positions of the pointer (particularly mouse) device as a physical entity, when it is movable, or the absolute angular positions of a movable element thereof such as a trackball, when the pointer is stationary, or the absolute position of a linearly movable pointer over a plane surface, or any other parameters of the condition of the hardware component of the pointer, are not relevant: what are relevant are the pointer index displacements, which are defined by changes in its X and Y coordinates and are visually evidenced by its displacements on the computer display.

It should be noted that one pair of coordinates X,Y or coordinate displacements, and therefore one pointer vector displacement, is often not enough to identify and select a computer operation. The operations that require more than one displacement of the pointer may generally be of either of two different kinds, as will be better understood by referring, for purposes of illustration only, to a mouse controlled computer in which a Windows program has been installed. In a first kind, the pointer is brought to a position in which it cannot cause the computer to do anything, except to open a menu window, and the pointer key, by whose means commands are transmitted to the computer—hereinafter the SELECT key—is depressed to open the window. The depression (or release) of a key can be called, as has been said, a "pointer (mouse) event". A pointer event may not involve a command to the computer to carry out any operation: e.g., placing a mouse in an empty position of the screen and depressing a key produces no computer action. However, pointer events occurring at certain positions on the screen, or after certain other events, may cause the computer to carry out an operation: e.g., placing the mouse over the SAVE position on a FILE window will produce the Save operation.

If now the SELECT key is released, nothing happens except that the window may close. No other action is caused by the mouse, until an operation is selected from the menu by bringing the mouse to an appropriate position in the menu and only then releasing the SELECT key. Therefore two displacements plus two mouse events produce one operation, which will be called "dual operation", and the two displacements that are required will be said to define "phases" of the operation. Exceptionally, more than two phases may be required to carry out a "multi-phase" operation.

In other cases, however, the total effect, which the user wishes to produce, is the consequence of a plurality of operations, each of which can be separately effected and has a separate significance, or at least, each of which requires the depression and subsequent release of the mouse SELECT key. E.g., changing a portion of print from one font and size to another font and size requires changing firstly the font and then the size, or vice versa; and changing the font type or size of a whole text, requires selecting the whole text and then the font type or size. Such operations will be called "two-stage operations" and each part of them will be called a "stage".

There are, finally, operations which comprise a succession of more than two stages. An example, in some computers, is the choice of the spacing between lines. This may require opening a FORMAT window, choosing in its menu the PARAGRAPH item, which opens another window, choosing in this window the LINE SPACING item, which opens a third window, and finally choosing in this latter the desired spacing. In graphic work, in many cases, a desired result cannot be obtained except through a succession of operations. In all these cases, the succession of operations will be called herein "program" and each operation will be referred to as a "stage" of the program, it being understood that each stage may be a single or a dual operation. Hereinafter, the term "operation unit" will be used to designate collectively a single-phase or ordinary operation, or a phase of a two- or multi-phase operations, or a program stage.

The nomenclature thus adopted has no other purpose than to clarify the present description and claims.

According to the invention, a method of operating a pointer controlled computer is provided, which comprises the following steps:

A—Choosing one of two pointer modes, the first of which is hereinafter synonimously called the "REGISTER" or "MEMORY" mode, and the second is hereinafter synonimously called the "ACTIVE" or "PLAY" mode;

B—When the pointer is in the REGISTER or MEMORY mode: a) selecting at least an operation unit, and preferably one from among a plurality of operation units, by bringing the pointer index to a reference position corresponding to said operation unit; and b) for each selected operation unit, causing the pointer index displacements relative to said reference position and a first, selected base point to be counted and registered or memorized as "differential (coordinate) displacements" $\delta X$ and $\delta Y$.

C—When the pointer is in the ACTIVE or PLAY mode: a) selecting an operation unit from among those previously selected in the REGISTER or MEMORY mode; b) determining the corresponding reference counter coordinates by applying the differential (coordinate) displacements $\delta X$ and $\delta Y$, with the appropriate sign, to the counter coordinates of a second base point; and c) carrying out the operation unit corresponding to said reference counter coordinates.

If more than one operation units are to be memorized and later performed, the aforesaid steps will be repeated for each one of them.

The REGISTER or MEMORY mode will be briefly indicated by "R/M mode" and the ACTIVE or PLAY mode will be briefly indicated by "A/P mode". The word "register" is used herein to denote an operation, and not an element of hardware as is customary in the electronics art.

In most cases, the first and second base points coincide. However, for some purposes, in certain embodiments of the invention, the second base point may be different from the first. Such an embodiment can be chosen, e.g., when the pointer displacements within a certain window must be repeated in the same or another window located at a different position on the computer screen, or for graphic purposes.

It should be noted that the differential displacements counted and registered in the R/M mode, and applied to base point counter coordinates in the A/P mode, are algebraic sums of elementary coordinate displacements. Since one X and one Y elementary coordinate displacement are concurrently counted and concurrently applied, Step C of the method of the invention could also be defined as follows:

C'—When the pointer is in the ACTIVE or PLAY mode: a) selecting an operation unit from among those previously selected in the REGISTER or EMORY mode; b) determining the corresponding reference position by applying the differential vector displacements to the position of a second base point; and c) carrying out the operation unit corresponding to said reference position.

In a preferred form, the method of the invention comprises:

1—Providing counters—hereinafter differential coordinate displacement or, brifly, DD-counters—for memorizing pointer index differential coordinate displacements and permitting to read and/or retrieve said displacements therefrom;

2—Choosing one of two modes, the R/M mode or the A/P mode;

3—When the pointer is in the R/M mode: a) selecting at least an operation unit; b) moving the pointer index from a selected base point to a reference position corresponding to said operation unit; and c) causing the pointer index coordinate elementary displacements occurring during said movement of the pointer index to be counted and registered or memorized as differential elementary coordinate displacements;

4—When the pointer is in the A/P mode: a) selecting an operation unit from among those previously selected in the R/M mode; b) bring the pointer index to said base point; c) successively applying to said pointer index said differential coordinate elementary displacements whereby to move it, through a succession of elementary vector displacements, from said base point to said reference position; and c) carrying out the operation unit corresponding to said reference position.

There are two variants of the method of the invention, depending on the choice of the base point and, corresponding to the manner in which the differential displacements are measured. In one variant, the base point is the actual position of the pointer index. In that case, the differential displacements are counted by bringing the pointer index firstly to a reference position, and starting to count displacement from that position. The counting of the displacements continues as long as the computer is in operation, and the displacements counted from any given reference position up to any moment, are the differential displacements relative to said reference position and a base point that is the point in which the pointer index finds itself at that particular moment. One can say, therefore, that the "counted displacements", in this case, are equal to the differential displacements relative to the same reference and base positions.

In a second variant of the method, the base point is a position which the pointer index occupies, or has previously occupied and/or the coordinates of which have been memorized, or can be a fixed point, e.g. the origin having coordinates $X_0$, $Y_0$: in that case, the displacements are counted from that point to the reference position. Therefore, the "counted displacements" are of the same magnitude, but of the opposite sign of the differential displacements relative to the same reference and base points; and, in order to determine the reference counter coordinates, as set forth in step 4b of the method, the differential displacements are applied to the coordinates of said base point, which have been memorized, and it is not necessary actually to bring the pointer index back to it, although this is possible.

In an embodiment of the invention, when the base point is a fixed point, particularly the origin, the first registered differential displacement is ignored or neutralized in the A/P mode. A special command or a special key or combination of keys can be provided for this purpose. Then the differential displacements following the first are effected by the pointer, in the A/P mode, starting from the point in which the pointer is located when said mode is chosen. In this way the same results are obtained as when changing the base point from the R/M to the A/P mode, but the same, fixed base point is always used, which is convenient.

Further, it has been said that to apply the differential (coordinate) displacements δX and δY, with the appropriate sign, to the counter coordinates of the base point means to subtract said displacements from said counter coordinates. In the aforesaid second variant of the method of the invention, in which the counted displacements are the opposite of the differential displacements, to apply the differential displacements δX and δY, with the appropriate sign, to the counter coordinates of the base point means to add the counted displacements to said coordinates.

When said second variant of the method is carried out in connection with a multi-phase operation or with a program, which are composed of a plurality of operation units, the differential displacements are counted by: a) bringing the pointer index to the selected base point, b) displacing the pointer index and counting displacements starting from said base point until the first reference position has been reached, c) registering said first counted displacements, d) displacing the pointer index and continuing to count displacements from said first reference position until the second reference position has been reached; e) registering said second counted displacements; and so on, displacing the pointer index from one reference position to the next and counting the respective displacements, until the last reference point has been reached. It can be said that, in this case, the operation units and the corresponding reference points are arranged in a succession, and each reference point is the base point relative to the next reference position. However, this variant can be modified by registering not each second, third etc. counted displacements, but the sums of each X counted displacement and all the preceding X counted displacements and the sums of each Y counted displacement and all the preceding Y counted displacements: in this case, all the registered displacements have the same base point.

In multi-phase operations, generally, no commands are given by the pointer between phases, since no phase is independently performed, viz., the pointer events only cause the counting and registration of the displacements. In programs, on the other hand, commands may be given by the pointer between stages, as some or even all of the stages can cause the computer to perform some operation, viz., the pointer events include operative commands in addition to the counting and registration of the displacements. Therefore, the above definition of the method according to the invention must be read with the understanding that the operation units are the program stages and that step B) of the method includes a sub-step Bc): causing the pointer command or pointer event relative to the operation unit to be registered.

In general, the method according to the invention includes registering any pointer event at any time when in the R/M mode, and reproducing it and/or producing any action associated with it, when in the A/P mode. It should be noted that a pointer event may have different meanings and/or consequences, depending on the moment or phase of a program in which it is registered and/or reproduced.

Preferably, the differential pointer index (coordinate) displacements are memorized as a succession of digital values each representing an elementary coordinate displacement and said differential displacements are applied to the counter coordinates of the base point by moving the pointer index successively to effect said elementary displacements. Since the X and Y elementary displacements are concurrent, the result of this procedure is that the index moves from the base point to a reference position (or vice versa) through a succession of elementary vector displacements, viz. by the same route that it followed in going from the reference position to the base point (or vice versa). The "motion" of the index is generally visible on the computer screen, but if the computer software should cause it not to be visible. This would be irrelevant. If the invention is used to register and reproduce the trajectory of the pointer index, the starting point of its motion may be considered as a base point and its end point (even if it coincides with the starting point, in a closed trajectory) may be considered as a reference position. The expression "reference position" must be construed, therefore, to include positions that do not actually correspond to operation units. In graphic programs or routines the pointer index trajectory is visualized on the screen.

The steps of the method, according to the invention, are preferably carried out as follows.

1. DD-counters are provided either in the pointer itself or in an interface or in the computer, and in the last case, this is preferably done by allocating, as such counters, memory banks of the computer RAM (although such counters could be provided independently), and the differential (coordinate) displacements δX and δY are registered in the said DD-counters.
2. The R/M or the A/P mode is preferably chosen by actuating a MODE key, which can be provided in the pointer or be a key of the computer keyboard.
3. Operation units are selected and the pointer index coordinate displacements relative to their reference positions are registered in the DD-counters by actuating operative keys, preferably of the pointer or of the computer keyboard, which produce signals that embody the instructions so to register said δX and δY in the appropriate DD-counters, without interfering with the normal processing of pointer signals, in particular with the updating of the actual pointer index coordinates. Each key can be associated with one operation unit, or with one multi-phase operation or with one multi-stage program. In the latter case, since the phases or the stages are arranged in a succession, successive actuation of the same key will cause said phases or stages to be selected and the pointer index displacements relative to their reference positions to be registered in the DD-counters, in their appropriate succession. When a program is to be registered, and a sub-step 3c) is included in the method, the aforesaid keys will produce signals that embody the instructions to register the pointer commands or events in the appropriate succession with the displacements.
4. Operation units are selected, the δX and δY registered in the DD-counters are read or retrieved and applied to the coordinates of actual pointer index position or of a fixed point, to determine reference counter (coordinate) displacements, and the operation corresponding to these latter is performed—all of these by actuating operative keys, preferably of the pointer or of the computer keyboard, which produce a signal that embodies the instruction to carry out the aforesaid operation units. Each key can be associated with one operation unit, or with one multi-phase operation or with one multi-stage program. In the latter case, since the phases or the stages are arranged in a succession, successive actuation of the same key or combination of keys will cause said phases or stages to be carried out in their appropriate successions.

The mode can also be chosen by providing an icon on the computer screen, e.g. in the Tool Bar, and bringing the pointer index to said icon and t pointer to change from one mode to the other. However this last way of mode choosing is less desirable as it requires an additional displacement of the pointer index and involves an interference with the computer software.

A command can be given by a pointer or by the computer keyboard, or in general by any device comprising keys, by producing pointer events, either by actuating a key specifically associated with that command or by actuating, concurrently or in succession, two or even more keys specifically associated with different commands. Therefore the term "key", as used herein, generally includes a combination of keys, whenever this is possible; or, more precisely, the term "key" will include any combination of structural means by which a command can be given that is normally given by actuating a key.

The number of operations that can be selected in order to apply to them the method of the invention depends on the number of distinct pointer events that can be produced, e.g. on the number of keys available. However, the selected operations can be changed at will, as will better appear hereinafter. When the context of the computer display is changed, e.g., its size or its position on the screen is changed, the operations of the R/M stage should be repeated, although in principle this could be rendered unnecessary by suitable modifications of the computer program.

When the method of the invention is applied to carry out a number of programs, as is desirable for important applications, such as in graphic or CAD/CAM applications, it comprises the selection of the program, which precedes all stages of the R/M or the A/P mode and involves the selection of a number of DD-counters and other pointer commands memory banks, assigned to the program, and their arrangements in the appropriate succession. The program selection is then preferably effected by actuating a PROGRAM key. Correspondingly, however, only a single operative key is required. An alternative way of selecting a PROGRAM is to provide a window—whenever the computer program makes this possible—and to select the PROGRAM among those listed in the window, preferably, when the pointer is a mouse, by using the mouse index and a mouse key, e.g. the SELECT key, in the usual mouse actuation manner.

In a typical way of carrying the invention into practice, a conventional mouse can be provided which comprises three keys, hereinafter indicated as L-, M-, and R-key. The L-key is the ordinary SELECT key, present in all mouse devices. The R-key is generally assigned specific functions, such as to open a particular window. The M-key is generally available, and if so, two combinations starting with it—herein considered as additional "keys"—are also available: M–L and M–R. In order to carry out the invention, a MODE key is needed. Therefore two other keys are available with such a mouse. If programs are to carried out, said two other keys can be a PROGRAM key and a single operative key. If separate operations are to be carried out, two such operations may be selected at any time. To increase the number of operations, keys of the computer keyboard can be used. Alternatively, additional physically distinct keys may be provided in the mouse, as will be exemplified later.

In an additional variant of the method of the invention, the mouse can be used for carrying out separate operations as well as a program. The mouse keys will then select two operations and cause them to be performed, as hereinbefore set forth. However, additionally, when the mouse is in the R/M mode and a computer keyboard key—which includes a combination of two or even more keys—is actuated, all subsequent differential displacements and operative commands of the mouse will be registered in appropriate counters or memory banks as constituting, in their succession, a program. Said key will be used to signal the completion of the program R/M stage, either by releasing it, or, if it has been released, by actuating it once again. Said program will be carried out when the mouse is in the A/P mode and the same key is actuated This invention also provides a pointer (particularly a mouse) controlled computer apparatus, which comprises:

I—a pointer, comprising means for producing and transmitting to a computer at least signals corresponding to pointer index displacements and other desired information and instructions;

II—a computer having means for receiving and means for processing signals from said pointer, said processing means comprising means for causing pointer index displacements and other operations directed by said signals to be carried out;

III—means for identifying, among said signals, those corresponding to differential (coordinate) displacements;

IV—counter means for registering differential (coordinate) displacements;

V—means for reading and/or retrieving said differential (coordinate) displacements and determining from them the reference counter coordinates; and VI—means for performing the operations corresponding to said reference counter coordinates.

In a preferred embodiment of the invention, the aforesaid means III, IV and V are included in an unconventional Asynchronous Interface (AI/F), which preferably, though not necessarily, includes all the circuitry needed to perform the functions of a conventional AI/F, and if not, is in series with a conventional AI/F. Thus the apparatus comprises a mouse, a computer, and electronic circuit means, particularly Asynchronous Interface (AI/F) means conveniently embodied in a card or in two cards, which identify the signals corresponding to mouse differential (coordinate) displacements, as well as other relevant mouse events and operative commands, register the same, and read and/or retrieve the same. Said AI/F may also embody all the circuital features required to carry out the functions of the conventional AI/F, e.g. of the RS-232, and in this case it is inserted into the computer in its place, or it may embody only the additional features required for carrying out the invention, and in that case it is conveniently inserted into the computer in series to the presently used AI/F. The unconventional Asynchronous Interfaces or combinations of AI/F, used according to the invention, are also in themselves a part of the invention.

DETAILED DESCRIPTION OF PREFERRED EMBODIMENTS

The following embodiments are described as embodying a mouse. However, as has been said, this is done by way of illustration only and essentially the same embodiments can be carried into practice by means of other types of pointers, with obvious adaptations. The term "mouse", as used hereinafter, should therefore be understood as indicating any pointer.

Figure 1:
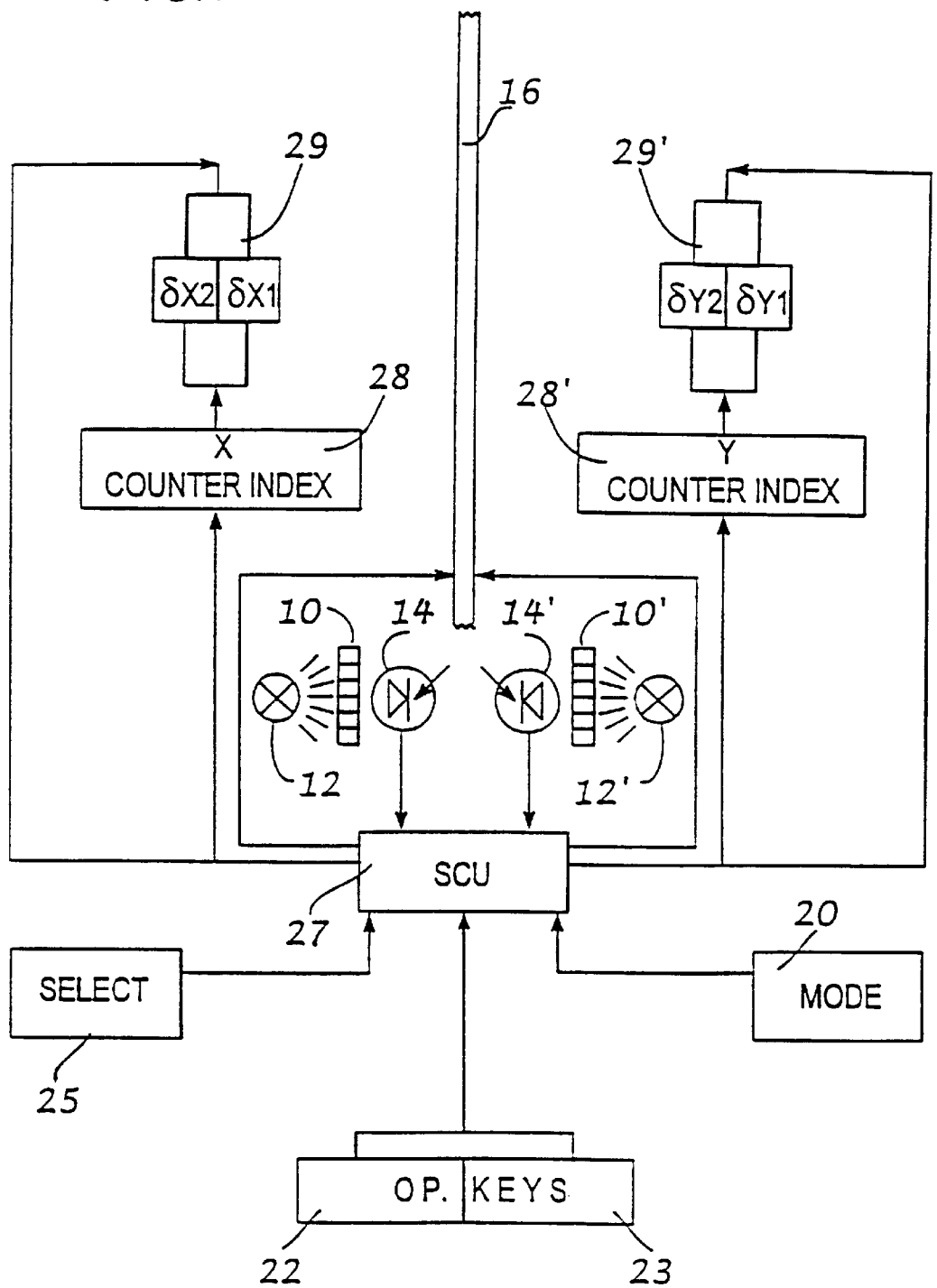
FIG. 1 illustrates, in block diagram, an apparatus according to a first embodiment of this invention.

FIG. 1 illustrates, in block diagram, an apparatus according to a first embodiment of this invention. Said apparatus comprises the conventional mouse components, of which only the following are symbolically illustrated: the SELECT key 25, displacement pulse generators, comprising wheels 10–10', light sources 12–12' and photodiodes 14–14'; and conductor 16 through which the signals from the mouse are transmitted to the computer. The apparatus additionally comprise counter indexes 28–28'; a MODE key 20; two operative keys 23–23'; and DD-counters 29–29'. While the displacement pulse generators 10–10', 12–12', 14–14' must be housed in the mouse, all the other illustrated elements can be housed in separate components, in an interface and even in the computer itself. Some of these components—particularly the counter indexes and the DD-counters—may be, and generally are, comprised in a System Control Unit (SCU) 27, in which suitable programs are stored, and are illustrated as separate merely for the sake of clarity. In fact, all the electronic components can be integrated into a single microcircuit or small chip. On the other hand, the SCU may consist of a plurality of chips, one or more of which (particularly those that are present in conventional mouse devices) may be located in the mouse and one or more of them may be located in an interface (as the Microcontroller Unit (MCU) hereinafter described) or in the computer itself MODE key 20, the operative keys, the conventional displacement pulse generators, the DD-counters, and the SELECT key send input to SCU 27. Counter indexes 28–28' successively activate the X and Y DD-counters 29–29' to count the differential displacements, as directed by the SCU.

Only two operative keys and two pairs of DD-counters (δX1, δY1 and δX2,δY2) are shown in FIG. 1 and therefore the schematically illustrated apparatus would be adapted to carry out two operations only, but of more are to be performed, a correspondingly number of keys and DD-counters would be provided.

Figure 2:
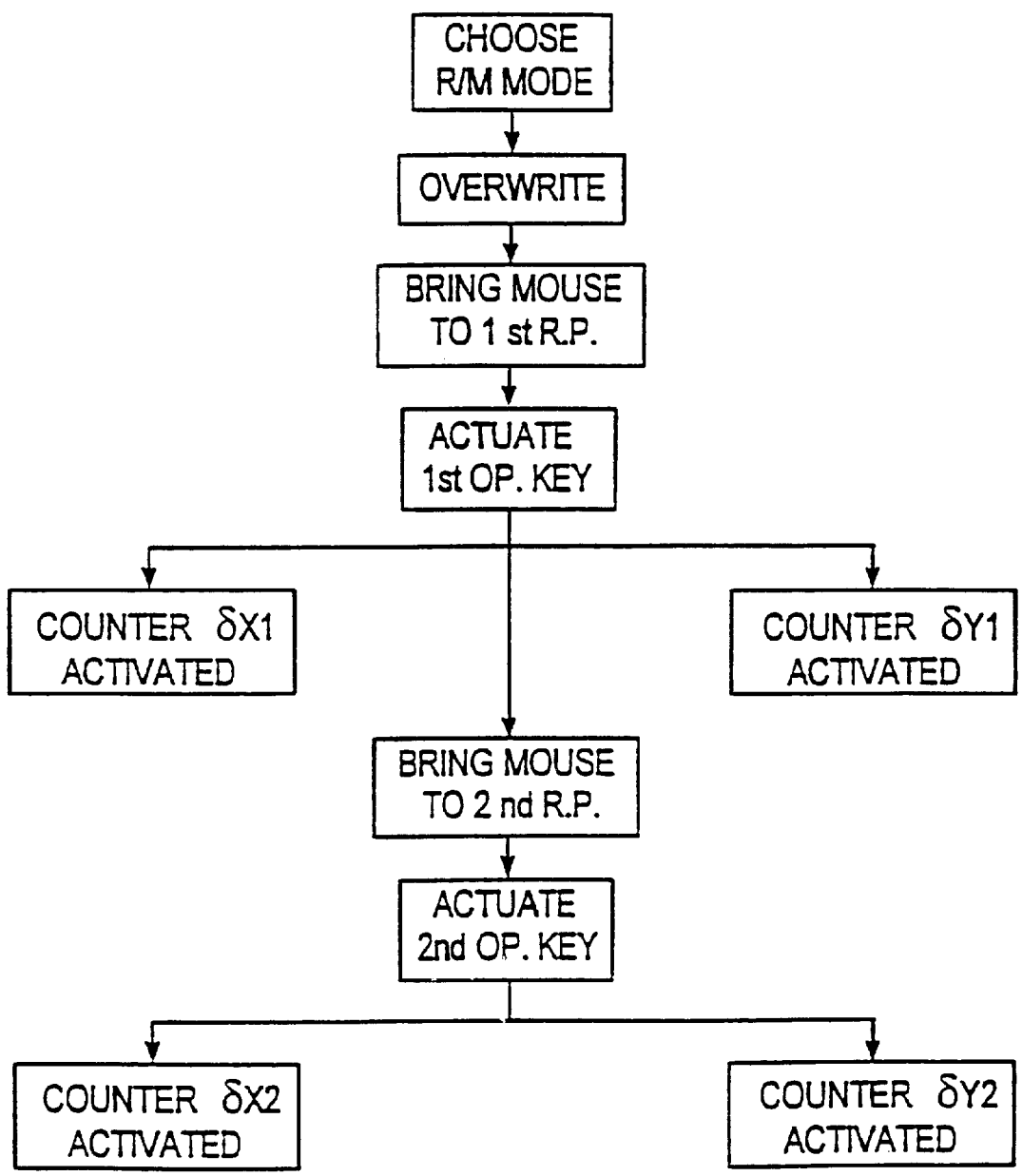
FIG. 2 illustrates in process flow diagram form what happens in the R/M mode according to an embodiment of the invention.

FIG. 2 illustrates in process flow diagram form what happens in the R/M mode according to the first embodiment of this invention.

The R/M mode is firstly chosen, generally by depressing a key, preferably, but not necessarily, in the mouse itself. The system works then in the OVERWRITE manner, viz. the signals that are registered in the DD-counters cancel any others that might have previously been registered and the result is as if the counters had been zeroed.

Thereafter, the mouse is brought to a first reference position (indicated as 1st R.P.) corresponding to a selected operation unit. When the mouse is in the 1st R.P., a command is given, preferably by actuating a first operative key (1st Op. Key) to start registering in the corresponding DD-counters, as differential displacements, the displacements that will occur thereafter. The same displacements, however, will continue to be dealt with as actual mouse displacements and will cause corresponding variations of the counter coordinates. The registration of the said differential displacements will continue, in this embodiment of the invention, unless and until the same 1st Op. Key is actuated to start registration from another reference position.

The same actions will be repeated for a second selected operation unit. If each unit is a complete operation, this will require the actuation of a 2nd Op. Key. If the two operation units are phases of a multi-phase operations or stages of a program, the 2nd Op. Key may the same as the 1st Op. Key. If more operation units are to be selected, the same actions will be repeated for each of them, using further DD-counters, to complete the R/M stage. For simplicity s sake, only two operation units are indicated in the process flow diagram.

Figure 3:
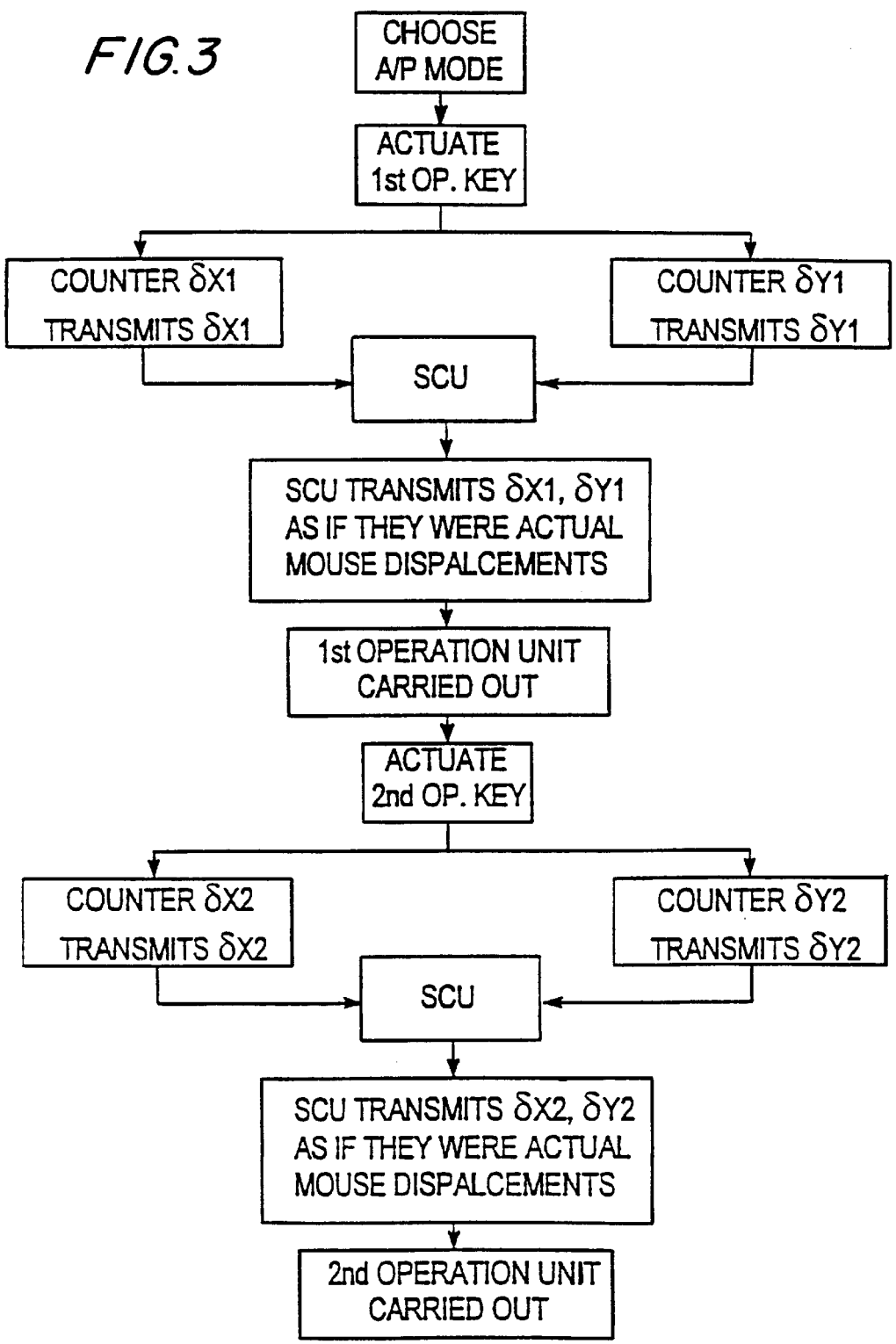
FIG. 3 illustrates in process flow diagram form what happens in the A/P mode according to the same embodiment of the invention.

When the A/P mode is chosen, the process steps illustrated in the process flow diagram of FIG. 3 will be carried out.

When the first operation unit is to be performed, an actuating command is given, preferably by actuating the 1st Op. Key. This causes counters $\delta X1$ and $\delta Y1$ to transmit the respective differential displacements to the SCU. The SCU transmits them, with the opposite sign, to the computer as if they were displacements originated by the hardware of the mouse, and therefore the computer "believes" that the said hardware has generated a motion of the index, normally seen on the computer screen, from the actual position it occupied when the 1st Op. Key was actuated, to the 1st reference position. The SCU also transmits the normal command to carry out the operation unit corresponding to the mouse coordinates and this causes the computer to carry out the operation unit corresponding to the phantom mouse coordinates—all according to the normal, unmodified computer program, no matter which program it is. If a second operation unit is to be performed, the said actions are repeated, but using a 2nd Op. Key. The same actions are then repeated for any further operation, using the respective keys. If the said operation units are phases of a multi-phase operations or stages of the program, a single key can be used, and when it is depressed, it may cause an operation to be carried out, and when it is released, it may cause the counter indexes to shift to the next DD-counters, as required.

Figure 4:
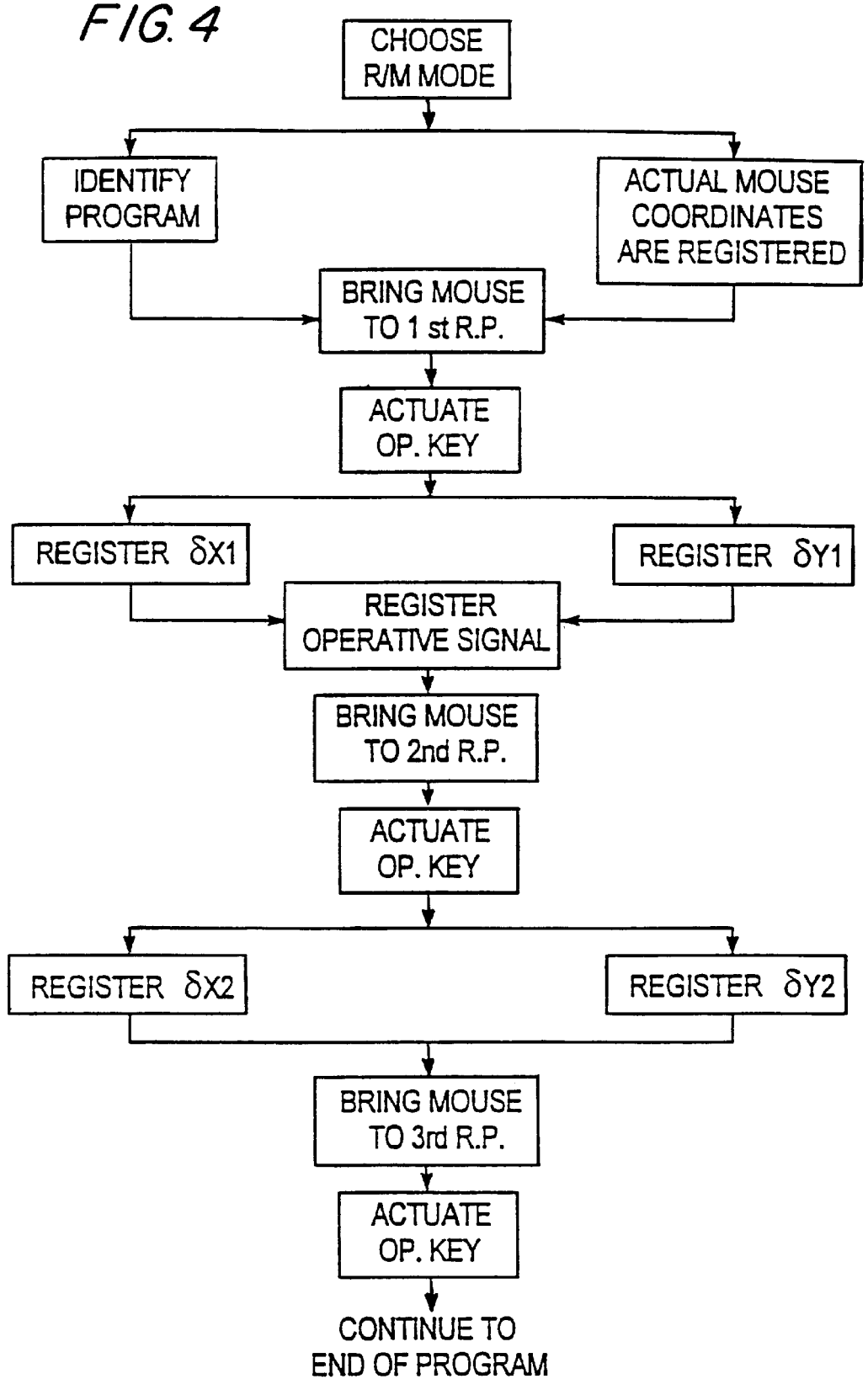
FIG. 4 illustrates in process flow diagram the R/M stage relative to a program, according to an embodiment of the invention.

The process flow diagram of FIG. 4 illustrates the R/M stage relative to a program. Since it is possible to carry out a number of programs, they must be identified in the R/M mode, e.g. by an ordinal number or by a letter, to establish a succession, so that it may possible to decide, in the A/P mode, which program to play out.

Once again, the R/M mode is chosen. This causes the coordinates of the actual position in which the mouse is at the time (which becomes the base point—or the first base point, as hereinbefore explained—for all the programs registered until the mode is shifted to A/P and then back to R/M) to be registered in the memory of the system. A signal indicating that the following program will be considered the first one, e.g. the number 1 or the letter A, is also registered, preferably by actuating a program key or by other means to be described hereinafter. Actually, there would be no need for such a signal in the R/M, as the programs might be arranged automatically in the succession in which they are registered/memorized. However, program selection means must be provided anyway for use in the A/P stage. Thereafter, the mouse displacements are counted and registered in DD-counters relative to the X and Y coordinates. Since the displacements are relative to the passage of the mouse from one reference position to another arranged sequentially, one could use a single X and a single Y counter, appropriately signaling the passage from one to the next displacement. For the sake of clarity, the block diagram will indicate separate counters for the successive displacements, relative to the first three operation units only, in order to contain the size of the diagram. The system being of course in the OVERWRITE manner, the mouse is brought to the first reference point, the first operative key is actuated and counters $\delta X1$ and $\delta Y1$ are activated. For the sake of example, it is assumed now that the first operation stage of the program corresponds to an operation that must actually be carried out. In this case, an operative signal is registered in sequence with the $\delta X1$ and $\delta Y1$, at an appropriate memory address. Thereafter, the mouse is brought to the second reference position. The same operative key—since in this embodiment of the invention, only one operative key is required—is self-actuated, and counters $\delta X2$ and $\delta Y2$ are activated. It is assumed, for the purpose of illustration, that the second stage of the program does not require any operation to be carried out. Therefore, the mouse is merely brought to a third reference position and the operative key is actuated once more, thus activating counters $\delta X3$ and $\delta Y3$, and so on, for as many program stages and as many intermediate operations as may be required.

Figure 5:
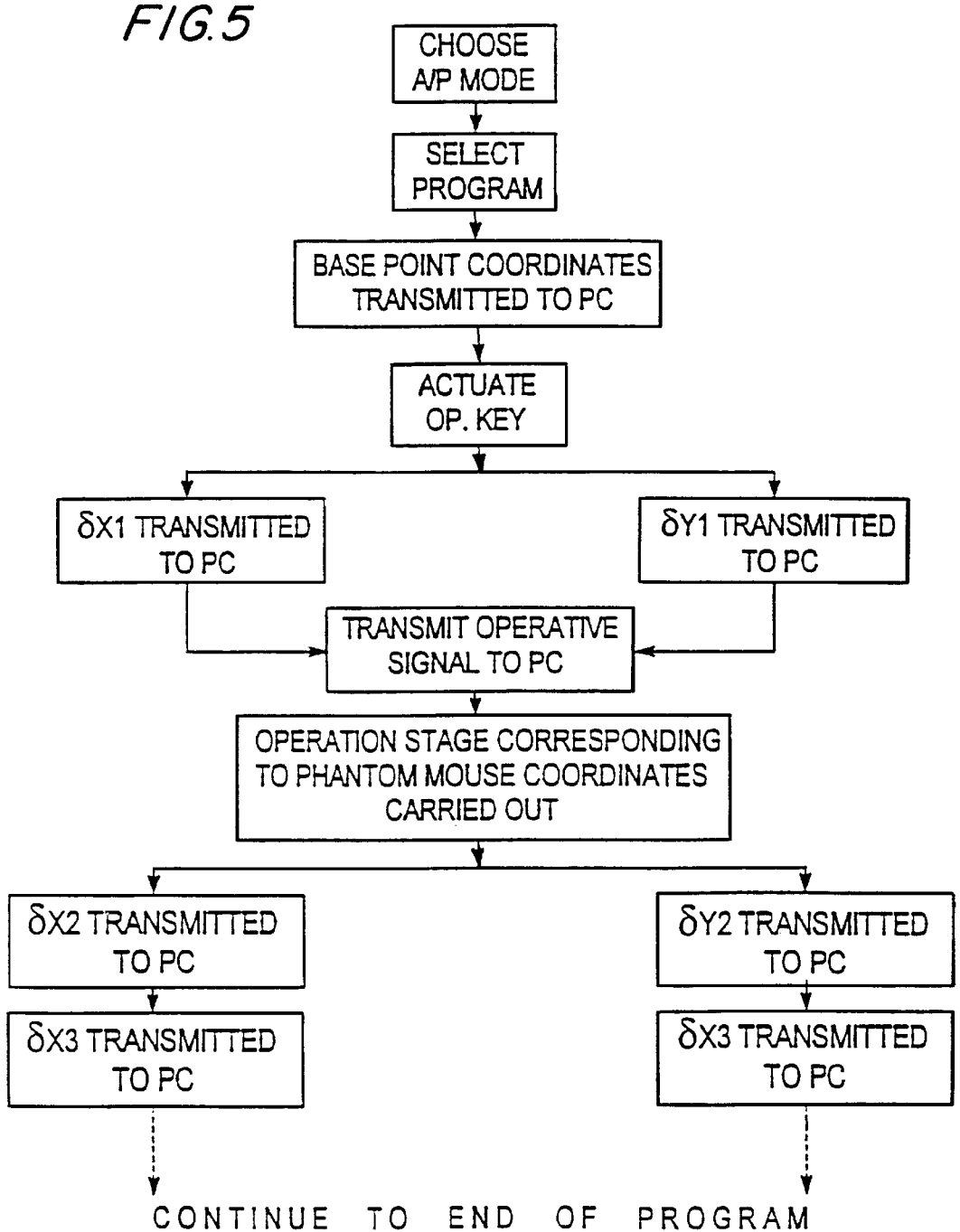
FIG. 5 illustrates in process flow diagram the A/P stage of the same program.

FIG. 5 illustrates in process flow diagram form the A/P stage of the same program. The A/P mode and the program are chosen—it is not critical which one is chosen first. This causes the base point coordinates to be retrieved and transmitted to the computer. The operative key is actuated, and this causes the $\delta X1$ and $\delta Y1$ counters to transmit the differential displacements to the computer, which transmits them as actual mouse displacements. The algebraic sums of the base point coordinates and of differential displacements, with the appropriate sign, are the reference counter coordinates to which the computer relates. At the end of the registration of $\delta X1$ and $\delta Y1$, as has been said, an operative signal or command has been registered, and this is been transmitted through the SCU, so that the computer performs the operation unit corresponding to the reference counter coordinates. Then the $\delta X2$ and $\delta Y2$ counters are activated, but without the need of actuating the operative key once again, since the succession of the operation unit is established by the choice of the program, and, once again, the counters transmit the differential displacements. However, no operative command has been given and therefore the computer carries out no operation except the displacement of the mouse. Now, automatically, counters $\delta X3$ and $\delta Y3$ transmit their differential displacements, and the succession operation continues, including the performance of specific operation stages, whenever they are selected to be performed.

It is obvious that the process flow diagrams of FIGS. 4 and 5 also describe a way of performing multi-phase operations, except that in that case there will never be any operative commands between phases; and that single-phase operations can also be carried out, treating each one as a single-stage program. Further it is possible to perform in the same way a plurality of operations that are normally effected in succession. The simplest case is that of two connected operations. E.g., COPY is always and CUT is often followed by PASTE. In some handing of a printed text, one may wish to stress parts of it, e.g. by printing them in bold and italics or in bold and a certain font. In graphic work, there are many cases of plurality (e.g. two) operations, each one producing its own result that may be carried out in succession a number of times. In such cases, said operations will be performed in succession as if they constituted a multi-stage program; and one operative key may cause said stages to be registered and/or performed automatically in the appropriate succession.

In some cases, after one stage of the program has been performed, the following stage should not be performed until the position in which it is to be performed has been chosen on the display by bringing the mouse index to it. In that case, in the R/M mode the Op. Key may be depressed twice in quick succession after bringing the mouse index to a reference position and before shifting it to the next position. The second actuation of the key will have been registered in the memory as a DISCONTINUE command, viz. a command to suspend the operation of the program and start it again when the Op. Key is once again actuated, and the operator will actuate it after the mouse index has been brought to the appropriate position in the display. Any successive stages of the program will be performed automatically.

The choice of the program can be carried out in various ways. One such way is to use a key on the mouse which has ten different positions, or can be depressed successively from one to ten times, thereby to send the appropriate signals to the SCU. The number identifying the chosen program may be seen through a display, e.g. a window through which a liquid crystal display is visible. It is convenient to place such a window in a position that is easily visible on the mouse when the program is being selected. Other ways of choosing and displaying an operation identifying signal can be used, though they are not illustrated: e.g., a disk could be provided, carrying on its periphery the operation numbers, which is rotated to bring the desired number opposite an index on the mouse body, or an icon could be provided on the computer screen showing said numbers (though this would require interfering with the computer software). These and other variants will be clear to skilled persons, who will have no difficulty in carrying into practice any one of them.

Another way to select a program is to open a widow in the computer's display, which window shows the program numbers, the desired number being chosen in the usual manner in which an item from a window is chosen by means of the mouse, by bringing the mouse index to the desired position and actuating the appropriate mouse key. In this case, the window can be opened by acting mouse keys: if the mouse is provided with three keys, the right-hand is often assigned to open special windows. The selection of the program will cause the selection of a number of pairs of DD-counters, successively associated at the different stages of the selected program, as well as of the memory addresses that may be required for registering operative signals.

In an embodiment of the apparatus according to the invention, all the unconventional components are located in the mouse. This means that the mouse comprises all the elements schematically indicated in FIG. 1, as well as the conventional elements not indicated therein, and the computer itself and the interface between mouse and computer can be conventional.

Figure 6:
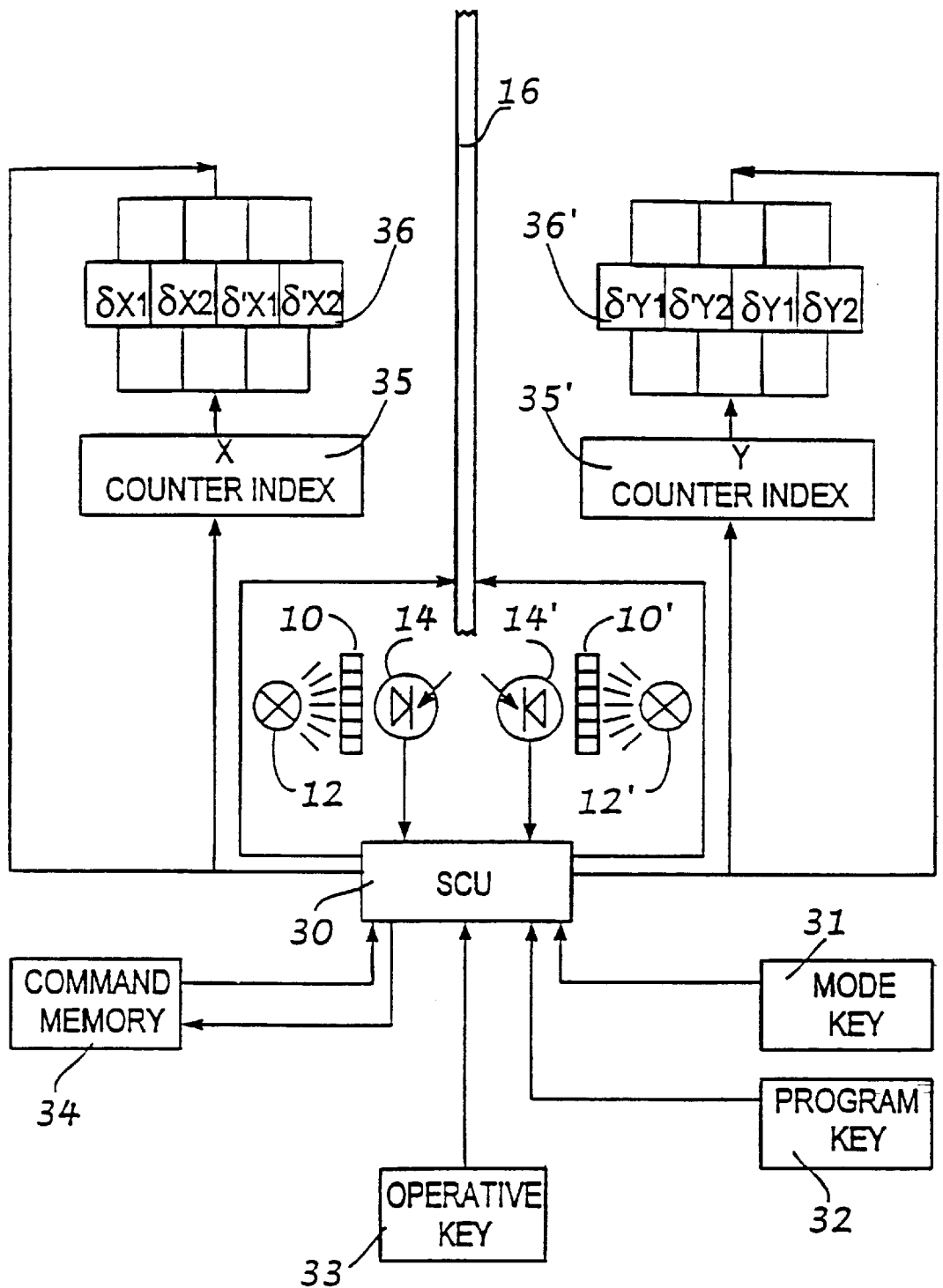
FIG. 6 illustrates in block diagram the circuit of a mouse adapted particularly for carrying out programs.

If the mouse is to contain all the unconventional elements, but is to be adapted particularly for carrying out a program, its inner circuit will be as schematically shown in the block diagram of FIG. 6. In said diagram, for simplicity's sake, it is assumed that only two programs are to be carried out, and each program consists only of two stages, so that only eight DD-counters ($\delta$X1,$\delta$Y1–$\delta$'X1,$\delta$'Y1, relative to the two stages of the first program and $\delta$X2,$\delta$Y2–$\delta$'X2,$\delta$'Y2, relative to the two stages of the second program) are shown. The conventional mouse components are the same as in FIG. 1, and they comprise displacement pulse generators (comprising wheels 10–10', radiation sources 12–12', and photodiodes 14–14') and the conductor 16. The operation of the apparatus is controlled by a System Control Unit 30, which receives input from the MODE key 31 and a PROGRAM key 32, as well as from all operative key 33, as well as from a Command Memory 34, in which operative signals and instructions are stored. Counter Indexes 35 and 35' control the DD-counters 36 and 36', of which, as has been said, only four pairs are indicated. All the components of FIG. 6 may be integrated in a mouse, which can then be operated without requiring any modifications in the computer or in the interface between mouse and computer.

According to other embodiments of the apparatus according to the invention, an interface is provided between the mouse and the computer, which sits on the bus slots of the computer. This embodiment is schematically illustrated in the block diagram of FIG. 7. Numeral 40 indicates the mouse. The mouse is, of course, a serial device and sends signals in sequential manner, as indicated at 41. Numeral 42 indicates a Universal Asynchronous Receiver/Transmitter (UART), which is connected to the bus 43 of the reference computer. For simplicity of illustration, it will be assumed, in describing this and the following embodiments, that the computer is an IBM PC or a clone thereof. Clearly, however, the invention could be applied to other computers, with adaptations, if any are needed, that would be well within the ability of a skilled person. Numeral 44 generally illustrates the interface that is inserted, according to the invention, between the mouse and the computer. This comprises a Microcontroller Unit (MCU) 45, a Memory 46, a Serial Communication Interface (SCI) 47 and a Serial Peripheral Interface (SPI) 48. The Memory contains the MCU routine, as well as a Memory Buffer.

Such an interface can be added, e.g., to the Motorola HCMOS 8-bit Single-Chip Microcontroller (MC68HC11) based evaluation board by using an IBM-PC standard Prototype Card Diagram (available in BIOS Technical Manuals) and wiring the interface on its prototype extension, to be connected to the IBM-PC bus. The resulting circuit provides:

512 bytes of internal EEPROM (block protect), 512 bytes of internal RAM (saved on standby or retained by low current backup source), Timer System,

SCI,

SPI,

Real Time Interrupt Circuit

Low Power mode.

Figure 7:
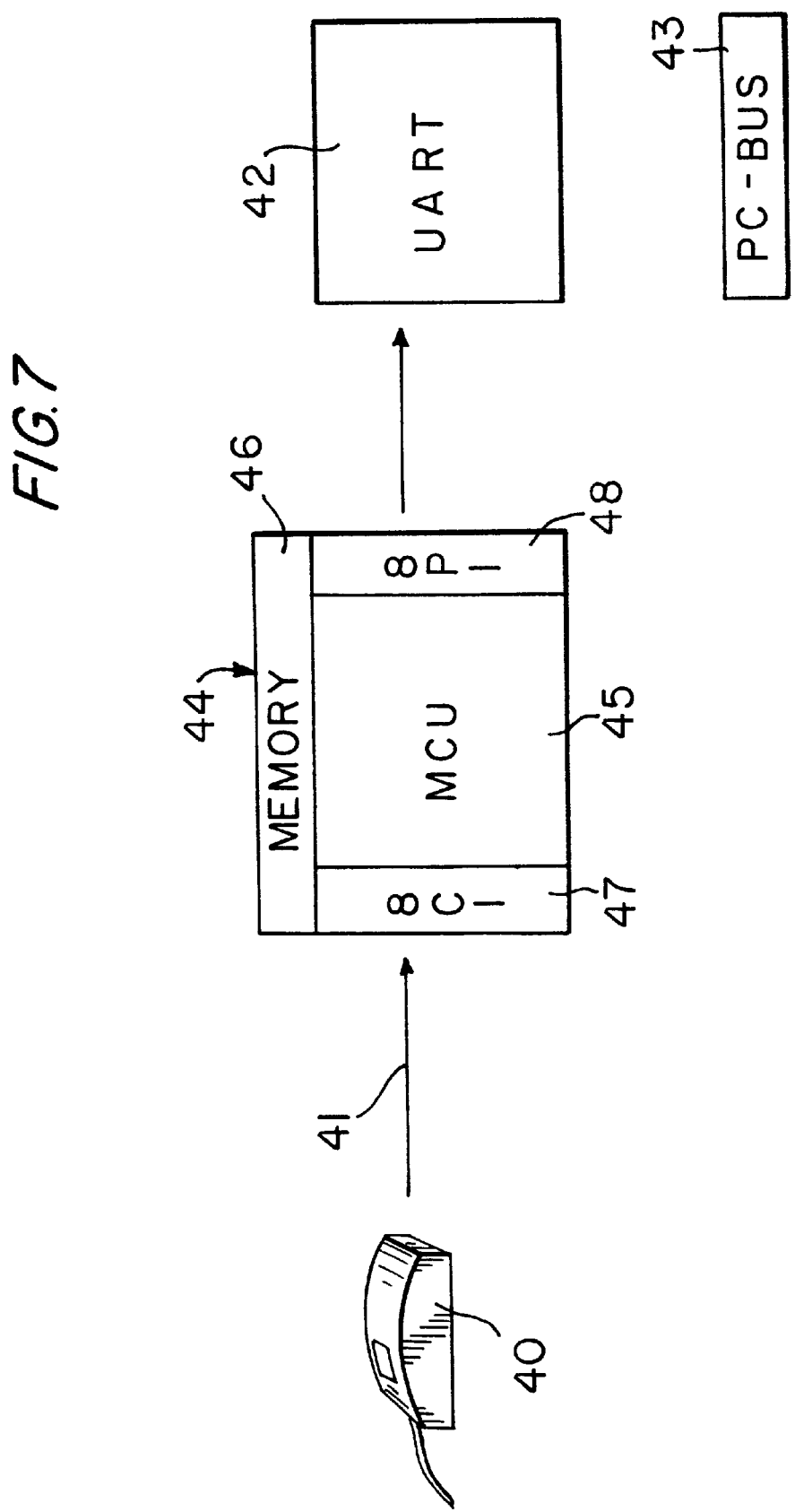
FIG. 7 illustrates an interface between mouse and computer.
Figure 8:
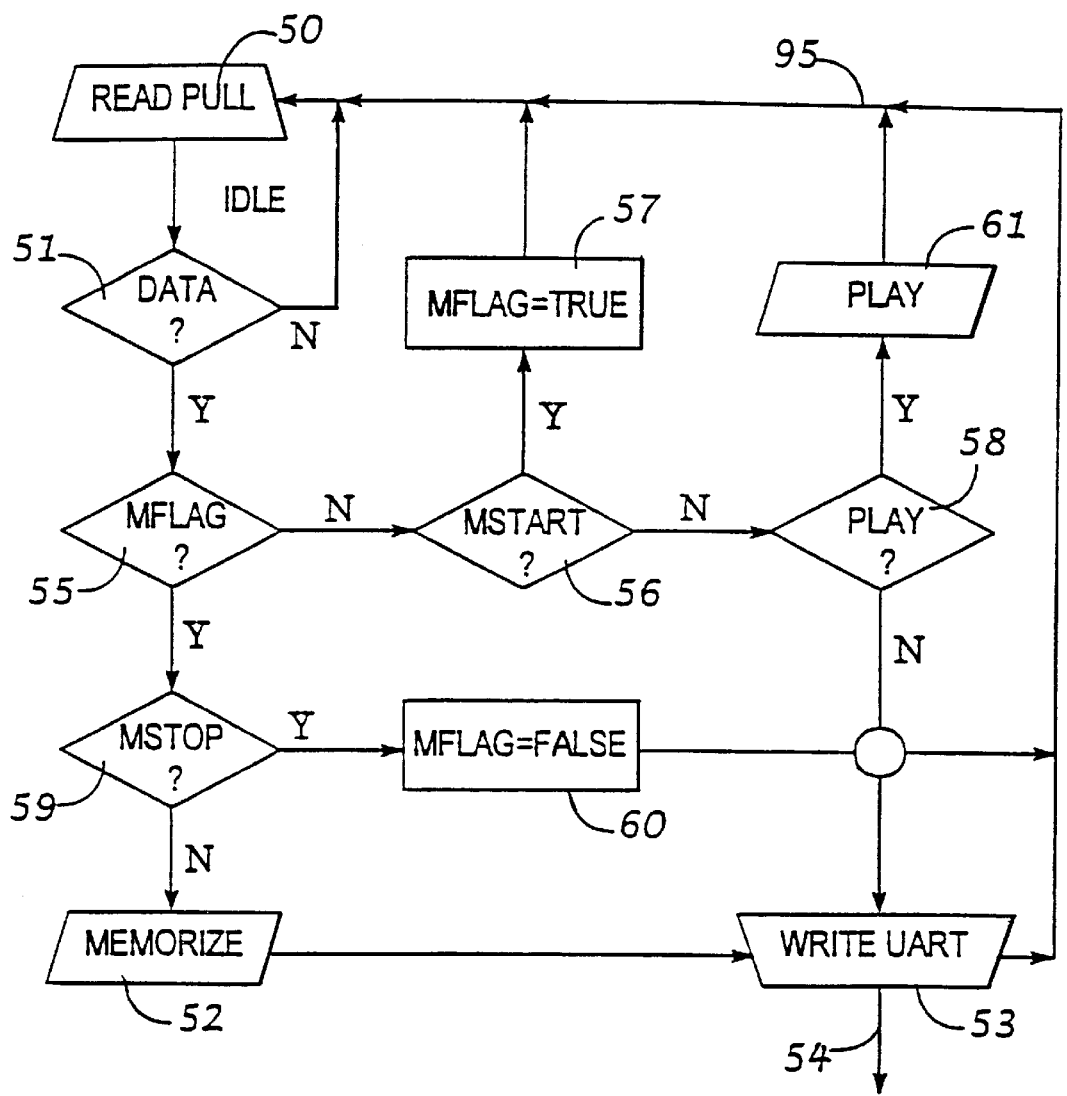
FIG. 8 illustrates in block diagram the operation of a component (Microcontroller Unit) of the interface of FIG. 7.

The Microcontroller Unit (MCU) of FIG. 7 carries out the operations that are schematically described in the block diagram of FIG. 8. The serial input from the mouse is indicated at 50. The device continuously operates in idle condition, until at is found, as indicated at 51, that an input datum has been received. If it has been received, it is checked, as shown at 55, whether the system is in the R/M mode, this fact having entered in an appropriate memory bank. If the answer is positive, it is checked, as shown at 59, whether the datum is a command to stop registering the data. If it is not such a command, the datum is memorized, as shown at 52, and is concurrently transmitted to the UART 53 and from it to the computer, as shown at 54, so that the same datum, while being memorized, is processed as in the normal mouse activity. Thus, if the datum is a displacement of the mouse, that displacement is entered in a DD-counter and concurrently the mouse is displaced, through the UART; if it is an operative command, it is memorized at the appropriate address and is concurrently executed, through the UART. Then the described cycle is repeated. If it is found, at 59, that the datum is a command to stop registering the data, it is carried out at 60, and the described cycle is repeated.

If it is found at 55 that the system is not in the R/M mode, it is checked at 56 whether the datum is not a command to shift to the R/M mode. If it is such a command, it is carried out at 57, and the described cycle is repeated. If at 56 it is found that the datum is not a command to shift to the R/M mode, it is verified at 58 that the system is indeed in the A/P mode, and if so, the A/P process is activated, as symbolically indicated at 61 and as more fully illustrated hereinafter in the block diagram of FIG. 9. If at 58 it is found that no command has been given to carry out any particular operation, the datum from the mouse is transmitted to the UART to be processed, as in conventional operation, after which the cycle described begins anew.

Figure 9:
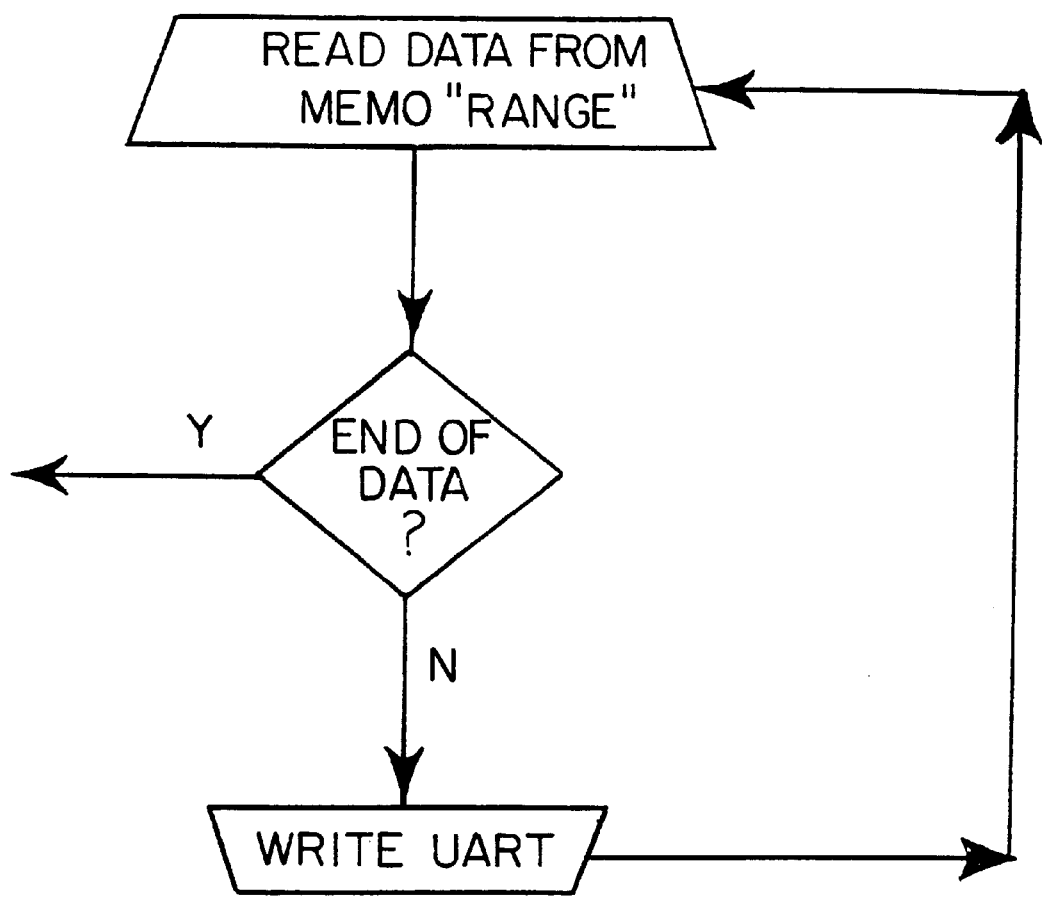
FIG. 9 illustrates in block diagram the operations of the A/P stage as carried out by said interface.

If the A/P process is activated, the operations indicated in FIG. 9 take place. Each datum received at 51 in FIG. 8 is read. It is checked if the datum is a signal that no more data will be received, and in this case the loop starting at 50 in FIG. 8 is restarted, as shown at 95 in said figure. If the datum is not such a signal, it is transferred to the UART 53 of FIG. 8, though by a connection not shown in said figure.

In another embodiment, the invention is applied to a system that comprises a mouse, which may be conventional, and a computer, in which the mouse driver has installed an IRS and an SL, with the corresponding IV's. While in order to carry out the process of the invention, said IRS could be canceled and a new one be substituted for it, in this embodiment said ISR is maintained and an additional ISR, which will be called "primary" or "new" ISR, is provided. The following operations are carried out:

loading the new driver (primary ISR);

setting the IV for the said primary ISR, and memorizing the address of the original or old ISR.

Figure 10:
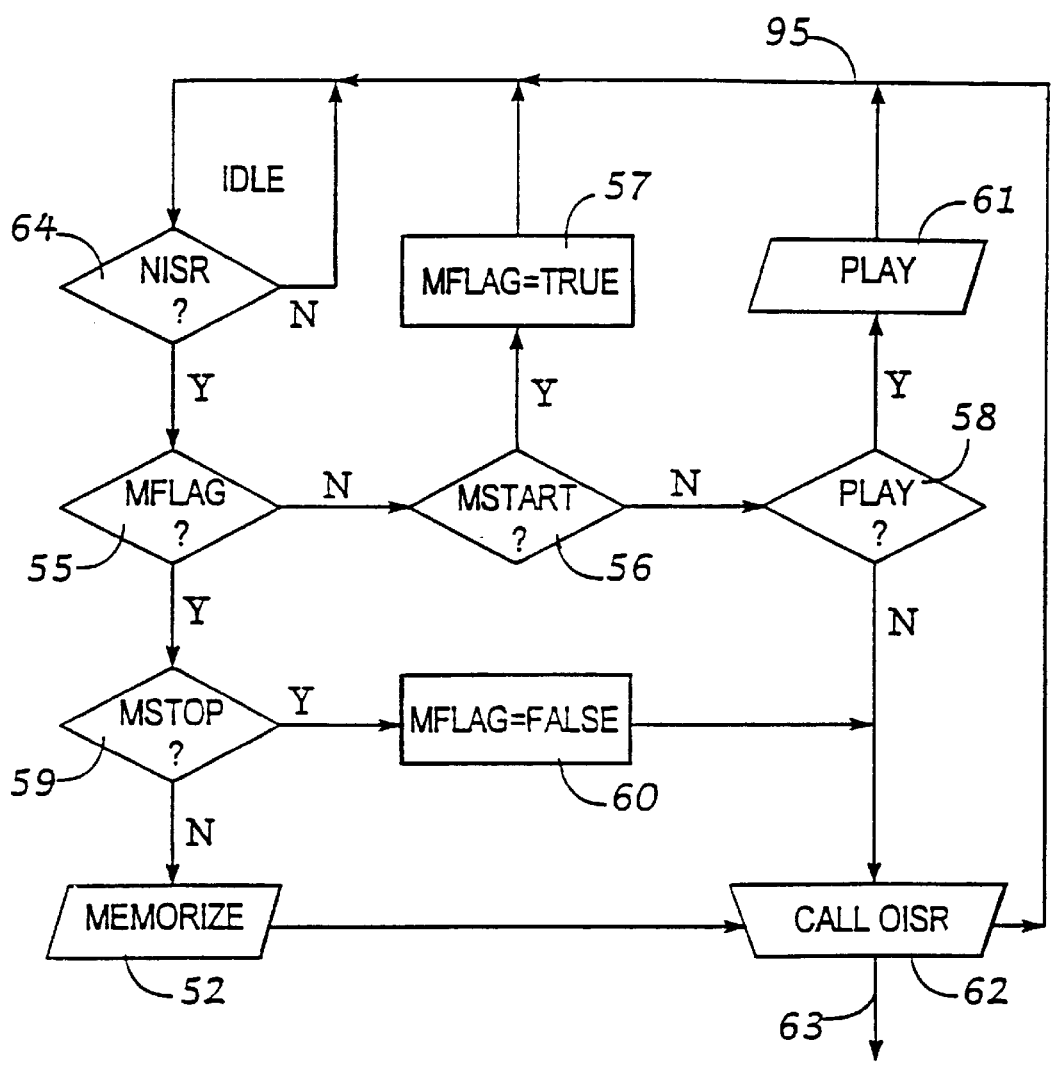
FIG. 10 illustrates in block diagram the operations performed in another embodiment of the invention.

FIG. 10 shows in block diagram form the operations that are carried out by the primary ISR. It is seen that the data from the mouse are elaborated firstly by the primary or new ISR (NISR), which carries out the steps characteristic of the invention, and transmits them to the original ISR as deriving from the mouse, thus creating what has been called a phantom mouse, while not interfering with the functions which the original ISR would carry out in conventional operations. FIG. 10 is essentially identical to FIG. 8 and the same elements thereof are indicated by the same numerals, the only differences being that instead of the UART there is on outlet 62–63 to the original ISR and the check carried out at 64 has the purpose of determining whether an input has been received that is to be routed to the primary ISR.

The A/P process is the same as represented in FIG. 9.

Figure 11:
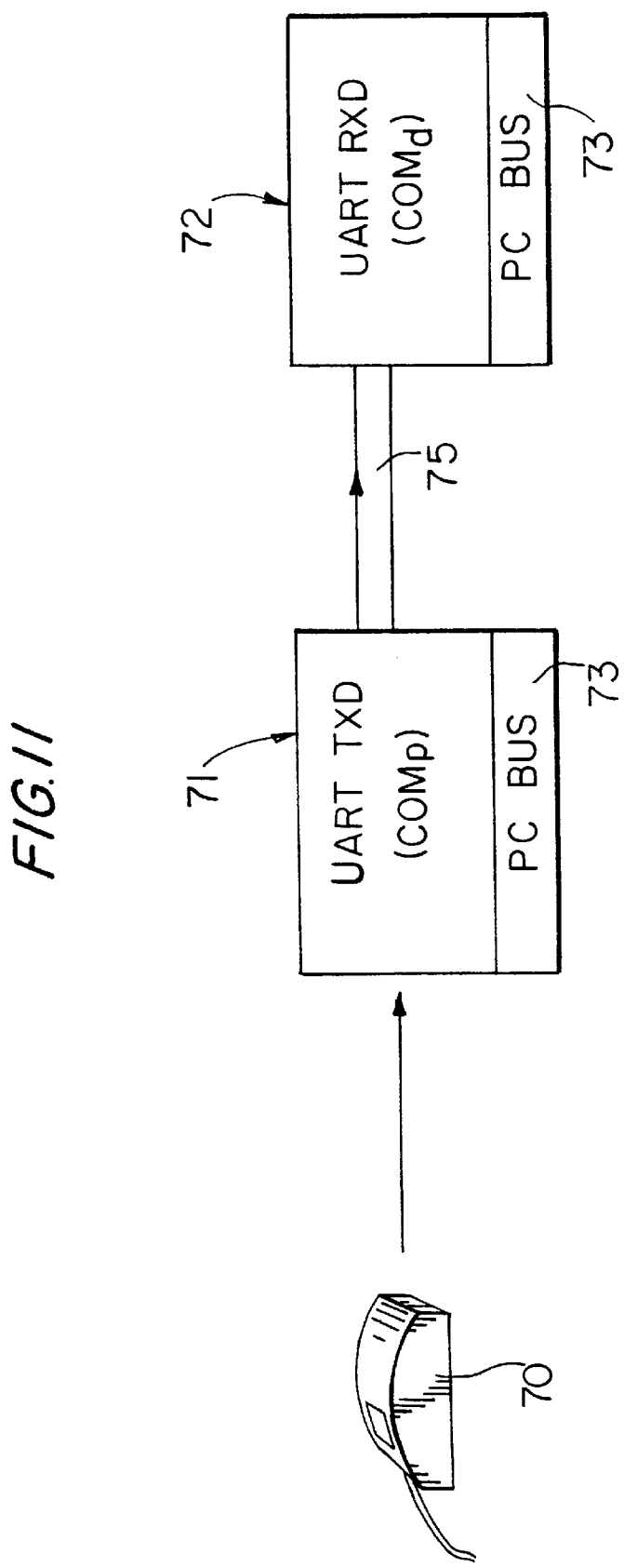
FIG. 11 illustrates another interface between mouse and computer.

A further embodiment of the invention is illustrated in block diagram in FIG. 11. This involves the use of at least two COM ports. Said COM ports may be contained in a single interface or may be in separate interfaces connected by an internal or external connection respectively. Such interfaces already exist and are available on the market. According to the invention, however, a supplementary shortage 75 is introduced between the TxD pin of the first COM port, which will be known hereinafter as the "primary port" and will be indicated by COMp, to the RxD pin of the second COM port, which will be called hereinafter the "driven" port and will be indicated by COMd. Further, the TxD of the COM2 is connected directly to the mouse and the DSR and DTR control lines of the two COM ports are joined together. In the diagram of FIG. 10, the mouse 70 is connected to the COMp indicated at 71 and this is connected to the COMd indicated as 72. Both ports include a UART and are connected to the computer bus indicated at 73. The COMp (71) performs all the operations that are described in FIGS. 8 and 9. The only difference is that, instead of the UART 53 of FIG. 8, the UART of COMd (72) is used, so that all the normal mouse operations, as well as the play operations, are carried out through it.

Figure 12:
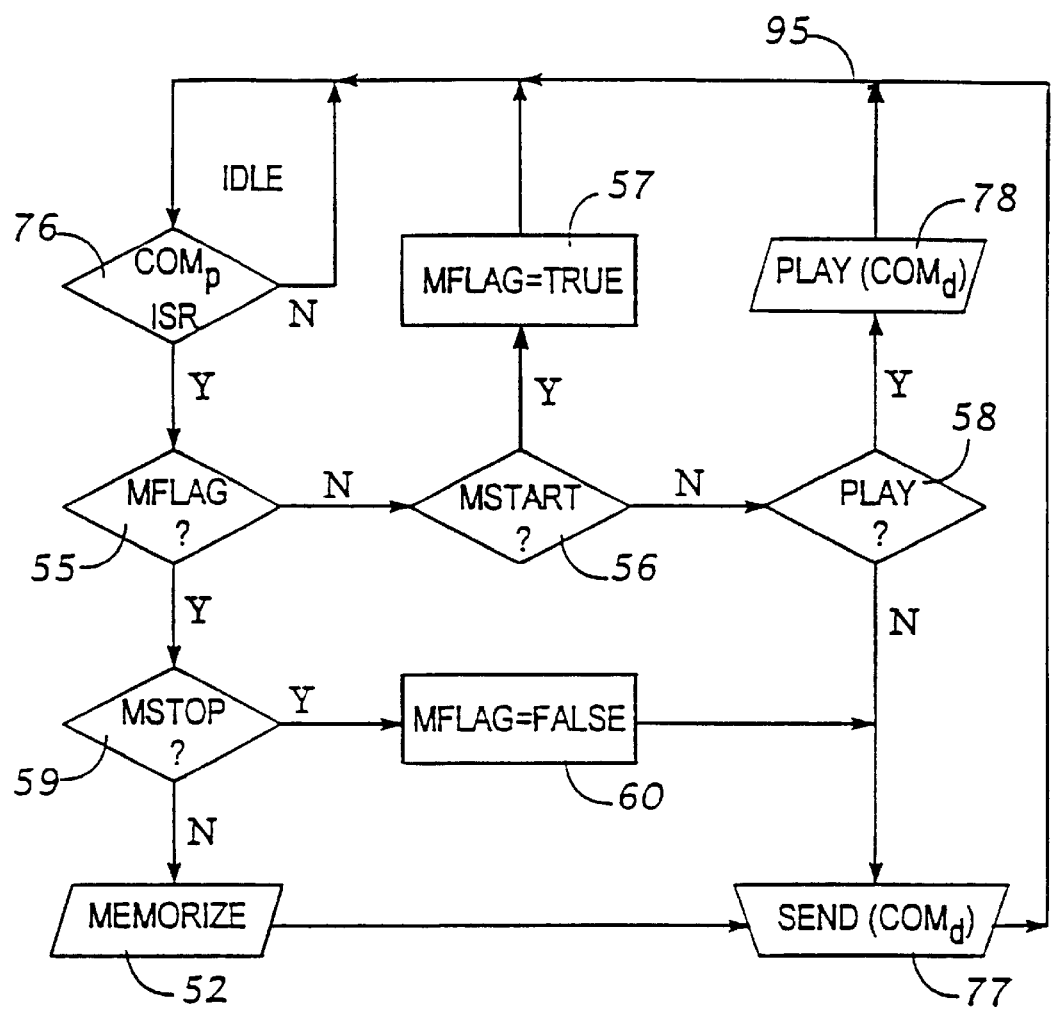
FIG. 12 illustrates in block diagram the operations carried out by a component of the interface of FIG. 11.

FIG. 12 shows in block diagram form the operations that are carried out by the first COM port 71. It is seen that the data from the mouse are elaborated firstly by said COMp, which carries out the steps characteristic of the invention, and transmits them to the second COM port 72 as deriving from the mouse, thus creating what has been called a phantom mouse, while not interfering with the functions which said COMd would carry out in conventional operations. FIG. 12 is essentially identical to FIG. 8 and the same elements thereof are indicated by the same numerals, the only differences being that instead of the UART there is on outlet 77 to the UART of the second COM port 72. The check carried out at 76 has the purpose of determining whether an input has been received that is to be routed to the fist COM port 71, and that the A/P operations, indicated at 78, are carried out by the second COM port 72. Said A/P operations are, once again, those represented in FIG. 9.

Figure 13:
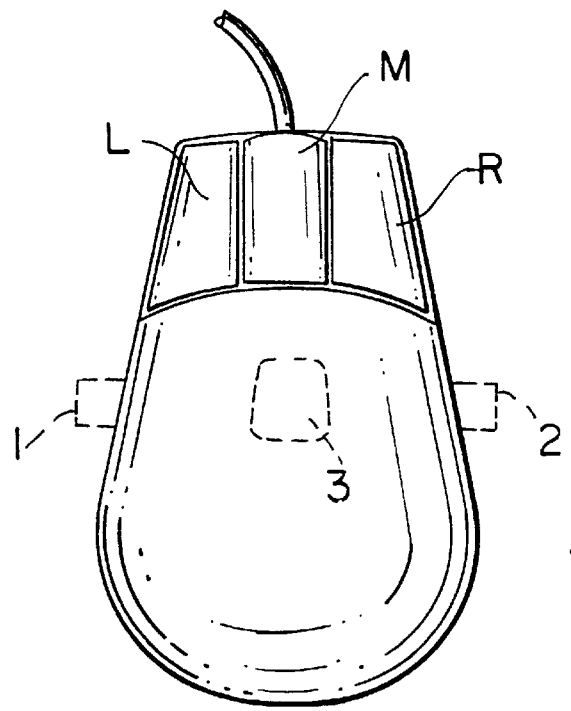
FIGS. 13 and 14 show in plan view two alternative mechanical embodiments of mouse.
Figure 14:
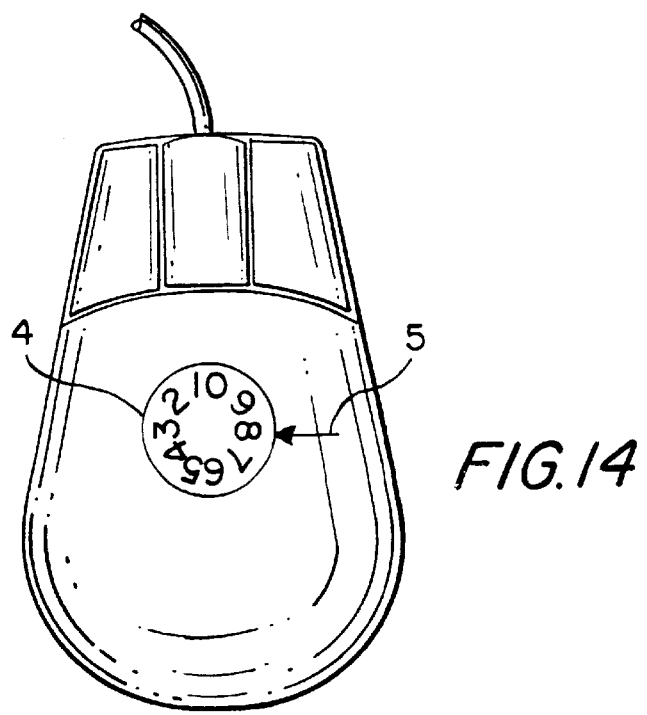

It is convenient, though not necessary, to use as mechanically conventional a mouse as possible in carrying out the invention. FIG. 13 shows such a mouse. It has three keys L, M and R. The L key is the usual mouse SELECT key, by which it directs the computer to carry out operations. The R key is generally allocated to other operations. The M, M–L and M–R keys (as stated hereinbefore, the term "key" includes combinations of keys} are available for activities according to the invention. If the mouse is intended for performing more than two different operations at any stage of its use, it may be necessary to add other keys, e.g. laterally placed ones, as indicated in broken lines at 1 and 2. If the mouse is intended for performing programs, one of the keys will be used for selecting the program and the mouse may be provided with display means, e.g. a liquid crystal display, displaying the number of the selected program, as shown in broken lines at 3. Alternatively, as shown in FIG. 14, the programs may be chosen by rotatable means, such as wheel 4, bearing the program numbers and associated with an index such as arrow 5. Similar arrangements can be provided in pointers that are not mouse devices.

It should also be noted that the sphere of a movable mouse may also be used as an additional key, particularly in the embodiments in which control means and a memory are provided in the mouse. If a contact is provided within the mouse, which is closed when the ball is in its lowermost position and open when it is in its uppermost position, as it is when the mouse rests on the plane surface on which it moves, or vice versa, it suffices to lift the mouse to cause the desired contact to be closed. The differential displacements relative to a chosen operation are registered in a separate memory bank, in the RUM mode, in the same way as those relative to any other operation. Then the mouse is lifted, and the closure of the contact causes the control means to direct said memory bank to be reached in the A/P mode only through the closure of the same contact. Then it sauces to lift the mouse sphere when the mouse is in the A/P mode, to cause the differential displacements relative to the chosen operation, as well as an operative command, to be transmitted to the computer, so that the chosen operation is carried out. Providing such a contact and programming the control means for such a function would involve no difficulty for a person skilled in the art. A particularly useful application would be to car out in this way the UNDO operation Additional power sources could be provided whenever required to keep electronic components under tension when the computer is switched off, and these may include, as has been noted hereinbefore, batteries, optionally rechargeable ones. In this case, means could be provided, such as a pilot light or a particular sign in the display window, to indicate battery failure at any time or at the time that the computer is switched on.

While embodiments of the invention have been described for purposes of illustration, it will be apparent that the invention may be carried with many modifications, variations and adaptations, without departing from its spirit or exceeding the scope of the claims.

I claim:

1. Method of controlling the operation of a computer from a pointer with the computer having a pointer index (cursor) responsive to the movement of the pointer, which comprises the following steps:

A—choosing one of two modes of operation for said pointer inclusive of, the R/M (REGISTER/MEMORY) mode and the A/P (ACTIVE/PLAY) mode;

B—when the pointer is in the R/M mode: (I) selecting at least one operation unit, and moving the pointer to bring the pointer index to a reference position corresponding to the selected operation unit; and (ii) counting the pointer index coordinate displacements relative to said reference position and a first, selected base point and storing in memory the counted displacements as differential coordinate displacements; and C—when the pointer is in the A/P mode: (I) selecting an operation unit from one previously selected in the R/M mode; (ii) determining the corresponding counter coordinates of the reference position by applying the differential coordinate displacements, with the appropriate sign, to the counter coordinates of a second base point; and (iii) carrying out the operation unit corresponding to said reference counter coordinates.

2. Method according to claim 1, wherein the first and second base points coincide.

3. Method according to claim 2, wherein the base point is an arbitrarily chosen point.

4. Method according to claim 2, wherein the base point is a position which the pointer index occupies or has previously occupied and the coordinates of which have been memorized.

5. Method according to claim 2, for performing a multiphase operation or a program, which includes a plurality of operation units in which the displacements are counted by: a) bringing the pointer index to any selected base point, b) displacing the pointer index and counting displacements starting from said base point until the first reference position, relative to the first operation unit, has been reached, c) registering said first counted displacements, d) displacing the pointer index and continuing to count displacements from said first reference position until the second reference position, relative to the second operation unit, has been reached; e) registering said second counted displacements; and so on, displacing the pointer index from one reference position to the next and counting the respective displacements, until the last reference point, relative to the last operation unit, has been reached.

6. Method according to claim 5, further comprising disregarding the displacement from the base point to the first reference position, when in the R/M mode.

7. Method according to claim 5, wherein commands may be given by the pointer between stages and when the pointer is in the R/M mode, said pointer commands are caused to be registered.

8. Method according to claim 1, wherein the base point is the actual position of the pointer index.

9. Method according to claim 8, which comprises counting the differential displacements by bringing the pointer index firstly to a reference position, and stating to count displacements from said position; continuing to count the displacements as long as the computer is in operation; and assuming the displacements counted from any given reference position up to any moment as the differential displacements relative to said reference position and a base point that is the position in which the pointer index finds itself at that particular moment.

10. Method according to claim 8, for performing a multiphase operation or a program, including a plurality of operation units, which comprises arranging the operation units and the corresponding reference points in a succession, and assuming each reference point as the base point relative to the next reference position.

11. Method according to claim 1, which comprises counting the differential displacements from the first base point to the reference position.

12. Method according to claim 1, wherein at least the first base point is a fixed point.

13. Method according to claim 12, wherein the base point is the pointer origin.

14. Method according to claim 1, further comprising the steps of:

D—providing differential coordinate, displacement counters for storing pointer index differential displacements having an output to read and/or retrieve said displacements therefrom;

E—selecting one of the two modes in step A;

F—when the pointer is in the R/M mode: (I) selecting at least one operation unit; (ii) moving the pointer index from a selected base point to a reference position corresponding to said operation unit; and (iii) counting the pointer index elementary coordinate displacements occurring during said movement of the pointer index and storing in memory the connected displacements as differential elementary coordinate displacements; and G—when the pointer is in the A/P mode: (I) selecting an operation unit from one previously selected in the R/M mode; (ii) bringing the pointer index to said base point; (iii) applying to said pointer index said elementary coordinate displacements to cause it to move through a succession of elementary vector displacements, from said base point to said reference position; and (iii) carrying out the operation unit corresponding to said reference position.

15. Method according to claim 14, wherein in the R/M mode the operation units are selected and the pointer index displacements relative to their reference positions are registered in the differential displacement counters by actuating operative keys, without interfering with the normal processing of pointer signals, including the updating of the actual pointer index coordinates; and in the A/P mode operation units are selected, the differential displacements registered in said counters are read or retrieved and applied to the coordinates of the base point to determine reference counter displacements, and the operations corresponding to these latter are performed, by actuating operative keys which produce a signal that embodies the instruction to carry out the aforesaid operation units, while disregarding the actual pointer index coordinates.

16. Method according to claim 1 further comprising:

D—choosing one of two modes of operation from step A;

E—when the pointer is in the R/M mode: (I) selecting an operation unit from among a plurality of such units by bringing the pointer index to a reference position corresponding to said operation unit; and (ii) causing the pointer index displacements relative to said reference position and a first, selected base point to be counted and registered or memorized as differential displacements;

F—when the pointer is in the A/P mode: (I) determining the corresponding counter coordinates of the reference position relative to said selected operation unit by applying the differential displacements, with the appropriate sign, to the counter coordinates of a second base point; and (ii) carrying out the operation unit corresponding to said reference counter coordinates; and G—repeating the aforesaid steps for another selected operation unit.

17. Method according to claim 1, further comprising the steps of

D—providing differential displacement counters for storing successions of pointer index elementary displacements with said counters having an output to read and/or retrieve said successions therefrom;

E—selecting one of two modes of operation from step A;

F—when the pointer is in the R/M mode: (I) selecting at least one operation unit by bringing the pointer index to a reference position corresponding to said operation unit; and (ii) causing the pointer index to undergo the succession of elementary displacements to move it from the selected reference position to a selected base point and storing each of said successions of elementary displacements and;

G—when the pointer is in the A/P mode: (I) selecting an operation unit from one previously selected in the R/M mode; (ii) causing the pointer index to move from the corresponding base point to the reference position corresponding to the selected operation unit; and (iii) carrying out the operation unit corresponding to said reference position.

18. Method according to claim 1, further comprising registering any desired pointer event when in the R/M mode and producing any action associated with it when in the A/P mode.

19. Method according to claim 1, wherein differential displacement counters are provided either in the pointer itself or in an interface or in the computer, and the differential displacements are registered in the said counters.

20. Method according to claim 1, wherein the R/M or the A/P mode is preferably selected by actuating a MODE key.

21. Method according to claim 1, wherein the pointer is a mouse device.

22. Pointer controlled computer apparatus, which comprises:

I—a pointer device, comprising means for producing and transmitting to a computer signals corresponding to pointer index displacements;

II—a computer having means for receiving and means for processing signals from said pointer device, said processing means comprising means for causing said pointer index displacements to be performed;

III—means for identifying signals corresponding to differential displacements;

IV—counter means for registering differential displacements;

V—means for reading and/or retrieving said differential displacements and determining from them reference counter coordinates; and VI—means for performing the operations corresponding to said reference counter coordinates.

23. Apparatus according to claim 22, comprising keys each associated with one operation unit.

24. Apparatus according to claim 22, comprising keys each associated with one multi-phase operation.

25. Apparatus according to claim 22, comprising keys each associated with one multi-stage program.

26. Apparatus according to claim 22, comprising keys that produce signals that embody the instructions to register pointer commands in the appropriate succession with the displacements.

27. Apparatus according to claim 22, wherein at least one of means III, IV and V is included in the pointer.

28. Apparatus according to claim 22 further comprising an Asynchronous Interface with said means III, IV and V included therein.

29. Apparatus according to claim 27 wherein the Asynchronous Interface is inserted into the computer.

30. Apparatus according to claim 28, wherein the Asynchronous Interface is embodied in a card.

31. Apparatus according to claim 28, wherein the Asynchronous Interface is embodied in two cards in series.

32. Method according to claim 22 wherein the pointer device is a mouse device.

* * * * *